US011085822B2

(12) United States Patent
Knobbe et al.

(10) Patent No.: US 11,085,822 B2
(45) Date of Patent: Aug. 10, 2021

(54) SPECTRAL ANALYSIS SYSTEM FOR CAPTURING A SPECTRUM

(71) Applicant: Fraunhofer-Gesellschaft zur Foerderung der angewandten Forschung e.V., Munich (DE)

(72) Inventors: Jens Knobbe, Dresden (DE); Heinrich Grueger, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 127 days.

(21) Appl. No.: 16/380,543

(22) Filed: Apr. 10, 2019

(65) Prior Publication Data

US 2019/0339128 A1 Nov. 7, 2019

(30) Foreign Application Priority Data

Apr. 10, 2018 (DE) ...................... 10 2018 205 401.0

(51) Int. Cl.
*G01J 3/02* (2006.01)
*G01J 3/18* (2006.01)
(Continued)

(52) U.S. Cl.
CPC ................ *G01J 3/28* (2013.01); *G01J 3/021* (2013.01); *G01J 3/0291* (2013.01); *G01J 3/18* (2013.01); *G01J 3/2803* (2013.01); *G01J 3/42* (2013.01)

(58) Field of Classification Search
CPC ........ G01J 3/0208; G01J 3/021; G01J 3/0256; G01J 3/0262; G01J 3/0291; G01J 3/04;
(Continued)

(56) References Cited

U.S. PATENT DOCUMENTS 8,045,159 B2   10/2011   Egloff et al.
8,390,806 B1    3/2013   Subramanian
(Continued)

FOREIGN PATENT DOCUMENTS

DE   102016118135 A1   3/2018

OTHER PUBLICATIONS

Tang et al. ("General study of asymmetrical crossed Czerny-Turner spectrometer", App. Opt. V. 54, No. 33, 2015) (Year: 2015).*

*Primary Examiner* — Hina F Ayub
(74) *Attorney, Agent, or Firm* — Perkins Coie LLP; Michael A. Glenn

(57) ABSTRACT

Spectral analysis system for capturing a spectrum including an inlet opening, a dispersive optical element and reflecting imaging optics having at least one optical functional element defining an optical path from the inlet opening across the dispersive optical element onto an outlet opening and/or detector area of the spectral analysis system and a carrier member defining a flat optical path volume with at least one lateral opening. The dispersive optical element is configured, e.g. in a stationary manner. At least one of the inlet opening, the outlet opening and/or detector area, the at least one optical functional element and the dispersive optical element are integrated in at least one member. The at least one member is mounted on the carrier member at the at least one lateral opening, such that the optical path largely runs transversely to a thickness direction of the optical path volume.

21 Claims, 25 Drawing Sheets

(51) Int. Cl.
*G01J 3/42* (2006.01)
*G01J 3/28* (2006.01)
G01J 3/04 (2006.01)
G01J 3/06 (2006.01)

(58) Field of Classification Search
CPC .... G01J 3/06; G01J 3/18; G01J 3/1804; G01J 3/28; G01J 3/2803; G01J 3/42
See application file for complete search history.

(56) References Cited

U.S. PATENT DOCUMENTS

| | | |
|---|---|---|
| 2009/0103088 A1 | 4/2009 | Delmas et al. |
| 2016/0245693 A1 | 8/2016 | Perez Calero et al. |
| 2018/0017441 A1 | 1/2018 | Hung |
| 2018/0087963 A1 | 3/2018 | Grueger et al. |

* cited by examiner

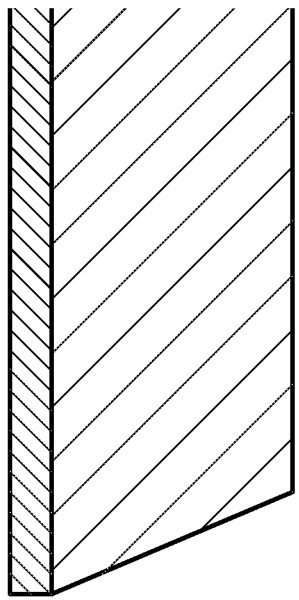
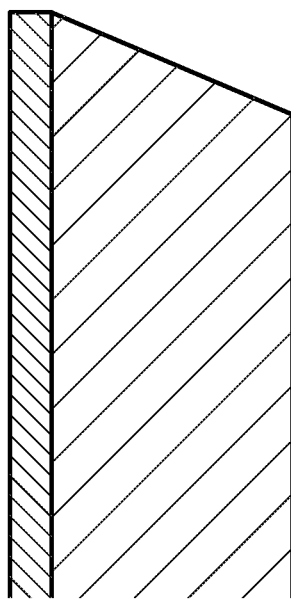
Fig. 4

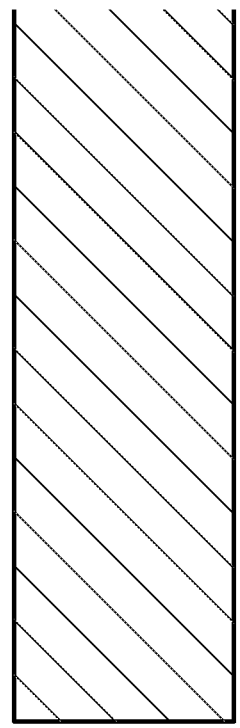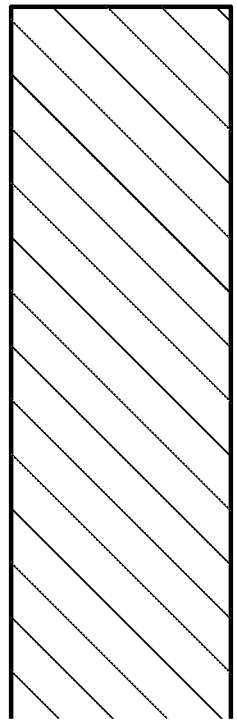
Fig. 5

SPECTRAL ANALYSIS SYSTEM FOR CAPTURING A SPECTRUM

CROSS-REFERENCE TO RELATED APPLICATIONS

This application claims priority from German Patent Application No. 10 2018 205 401.0, which was filed on Apr. 10, 2018, and is incorporated herein in its entirety by reference.

Embodiments according to the invention relate to a spectral analysis system for capturing a spectrum of electromagnetic radiation.

BACKGROUND OF THE INVENTION

In spectroscopy, so-called spectroscopic apparatuses are frequently used for detecting/measuring the spectrum of electromagnetic radiation, in particular in the spectral ranges ultraviolet (UV), visible (VIS) and infrared (IR). Here, the dispersive element needed for splitting the electromagnetic radiation is frequently configured as diffraction grating. New applications where spectroanalytical measurements play an important part, such as environmental measurement technology and food analysis need small, robust and cost-effective spectroscopic apparatuses, possibly in very large quantities. Here, it has to be considered that some of these applications call for powerful devices, comparable to commercially available compact spectrometers. As one example, the spectral resolution of such devices of 10 nm half width in the near infrared spectral range of 1000 nm to 1900 nm is stated.

The above-stated requirements cannot all be fulfilled at the same time with conventional technology. The three issues small structural size, low cost and large quantities at least partially contradict each other. With constant device performance, miniaturization results in complex components and/or assembly processes. This increasing complexity again causes increased production costs which may have a negative effect on the production of very large quantities. Solutions that can be produced at low cost in large quantities do not reach the requested performance.

MEMS-based spectrometers are known from conventional technology. MEMS spectrometers mean embodiments that are provided with a movable diffraction grating. These devices are produced in respective microtechnology and have an integrated drive for deflecting a grating mirror plate. With the selection of a suitable material system, e.g., silicon and the matching drive type, e.g., electrostatic, deflectable diffraction gratings having a large deflection amplitude can be produced, which are particularly well suited for the design of miniaturized spectroscopic apparatuses. A detailed description of such systems can be found in U.S. Pat. No. 8,045,159 B2 about hybrid spectrometers.

Laboratory and compact spectrometers are already known. These are, among others, Czerny-Turner spectrometers/spectrographs as standard and crossed variation. Further, MEMS grating spectrometers in stacked design with complex optical members are known which can, among others, be produced in a miniaturized manner.

For miniaturized and precise spectrometers, very small inlet openings and outlet openings might be needed. MEMS gaps in different substrate configurations are known.

In view of the above, there is a need for a concept allowing an improved tradeoff between reducing the structural size, reducing the cost as well as producing spectroscopic apparatuses in large quantities. Thus, a miniaturized spectroscopic apparatus comprising, for example, all the above-stated features is to be provided.

SUMMARY

According to an embodiment, a spectral analysis system for capturing a spectrum may have: an inlet opening, a dispersive optical element and an at least partly reflective imaging or beam forming optics including at least one optical functional element defining an optical path from the inlet opening across the dispersive optical element onto an outlet opening and/or detector area of the spectral analysis system, wherein the dispersive optical element is configured in a stationary manner; and a carrier member defining a flat optical path volume having at least one lateral opening, wherein at least one of the inlet opening, the outlet opening and/or detector area, the at least one optical functional element and the dispersive optical element is integrated in at least one member, wherein the at least one member is mounted on the carrier member at the at least one lateral opening, such that the optical path mainly runs transversely to a thickness direction of the optical path volume.

Another embodiment may have a method for capturing a spectrum by means of an inventive spectral analysis system.

One embodiment relates to a spectral analysis system, herein also briefly referred to as spectrometer for capturing a spectrum. The spectrometer includes an inlet opening, a dispersive optical element and an at least partly reflective imaging or beamforming optics having at least one optical functional element defining an optical path from the inlet opening across the dispersive optical element to an outlet opening and/or detector area of the spectrometer and a carrier member defining a flat optical path volume having at least one lateral opening. Here, the at least one lateral opening does not have to be an opening completely penetrating the carrier member but can also be, for example, a blind hole or a sink hole being at least open towards the optical path volume. Here, the optical path volume is defined, for example, such that a first plane of the optical path volume to which the dispersive optical element and the reflective imaging optics are perpendicular or almost perpendicular has a greater expansion than a second plane oriented in parallel to the dispersive optical element and the reflective imaging optics and perpendicular or almost perpendicular to the first plane. In other words, the optical path volume has a thickness direction (along a z axis) forming a or being perpendicular to the first plane (expansion in xy direction), wherein the optical path volume has, in thickness direction, a smaller expansion than an expansion within the first plane (e.g., an expansion in x or y direction or an expansion of the size of the clear dimension of the first plane). Additionally, in the spectrometer, at least one of the inlet opening, the outlet opening and/or detector area, the at least one optical functional element and the dispersive optical element integrated in at last one member. The dispersive optical element is configured, e.g. in a stationary manner. The at least one member is mounted to the carrier member at the at least one lateral opening, such that the optical path runs mostly transversely to the thickness direction, i.e., mainly laterally. For example, more than 50% of the distance of the optical path runs at an angle between 70° and 110°, 80° and 100° or 85° and 95°, each inclusive, relative to the thickness direction, such as at an angle of 90°, wherein more than 75% is also possible. In other words, the projected optical path transverse to the thickness direction has an angle between main section normal of the optical path transversal to the thickness direction and thickness direction between 0° and 20° or between 0° and 10° or 0° and 5°. The ratio of the optical path not transversal/transversal to the thickness direction is, e.g. at least 0 (no deflection mirrors) and at most 1:1.3 or 1:1.2 or 1:1.1. The at least one opening is, for example, an opening completely penetrating the carrier member. Then, the at least one member is mounted, for example, to the carrier member from the outside, i.e., to a side of the carrier member facing away from the optical path volume or the outside. However, the opening may not only be open towards the optical path volume but also transversal to the same, such as towards the top or bottom in the figures. Then, the at least one member could be inserted from there into the opening and mounted in the opening, i.e., along the thickness direction. Additionally, it is possible that the opening is not configured as passage opening but forms a funnel or a cavity, such as a blind hole that is opened towards the optical path volume and optionally also transversal to the same and into which the at least one member is inserted. Inserting is performed, for example, by means of a robot or "pick-and-place" method. This allows a compact design with the additional option of using spherical optics and hence lower production costs. Projected along a thickness direction of the optical path volume, the optical path can additionally be configured such that the same has crossing optical path portions. Thereby, an even more compact design becomes possible.

Embodiments of the spectrometer are based on a knowledge that individual elements (e.g., the inlet opening, the outlet opening and/or detector area, the at least one optical functional element and the dispersive optical element) or members of the spectrometer at a carrier can be easily and quickly disposed on a carrier member, for example by a pick-and-place method, whereby production of the spectrometer in large quantities becomes possible. Additionally, the individual elements and members can be produced quickly, simply and inexpensively by methods such as injection molding, glass molding, laser production, etc.

In one embodiment, the carrier member defines a flat optical path volume having at least two lateral openings. The at least two lateral openings can be at an angle to each other without causing any significant problems. The carrier member can be produced, for example, in injection molding, i.e., the same can be an injection molding member and can realize, in particular, all orientations of the at least two members that are advantageous for a compact design. In that way, the spectrometer can e.g., comprise two members, wherein, e.g., an optical functional element, such as a concave mirror is integrated in a first member and a further optical functional element, such as concave mirror or the dispersive optical element as well as optionally the outlet opening and/or the detector surface is integrated in a second member. In the latter case, the dispersive optical element as well as the outlet opening and/or the detector area could be arranged in the second member adjacent to one each other such that, when the second member is disposed at one of the at least two lateral openings, the same point in the direction of the optical path volume. Even when in this example two elements (two of the inlet opening, the outlet opening and/or detector area, the at least one optical functional element and the dispersive optical element) are integrated in one member, the spectrometer can also only comprise members into which only one element (e.g., the inlet opening, the outlet opening and/or detector area, the at least one optical functional element and the dispersive optical element) each or more than two elements is/are integrated.

Further, the at least two lateral openings of the carrier member can be oriented freely. The same can, as mentioned, be disposed at an angle to each other, such as at an angle to each other about an axis parallel to the thickness direction, wherein the orientation can be selected for minimizing the needed optical path volume. Additionally, it is easily possible to form a crossing optical path, whereby the optical path volume can be reduced further. By this freely orientable, possibly "skew" design, combined with an optionally crossing optical path, the spectrometer can be realized very in a very small manner with little production effort.

Thus, it has to be stated that elements and members of the spectrometer are configured or arranged such that production of the spectrometer in large quantities and/or as a very small system while reducing the costs is enabled.

BRIEF DESCRIPTION OF THE DRAWINGS

Embodiments of the present invention will be detailed subsequently referring to the appended drawings, in which:

FIG. 4 is a schematic illustration of an MEMS gap for the spectrometer produced with silicon microtechnology according to an embodiment of the present invention;

FIG. 5 is a schematic illustration of a gap for the spectrometer produced in metal by means of laser material machining according to an embodiment of the present invention;

DETAILED DESCRIPTION OF THE INVENTION

Before embodiments of the present invention will be discussed in detail based on the figures, it should be noted that identical, functionally equal or equal elements, objects and/or structures in the different figures are provided with the same reference numbers, such that the description of these elements illustrated in different embodiments is interexchangeable or inter-applicable.

Figure 1:
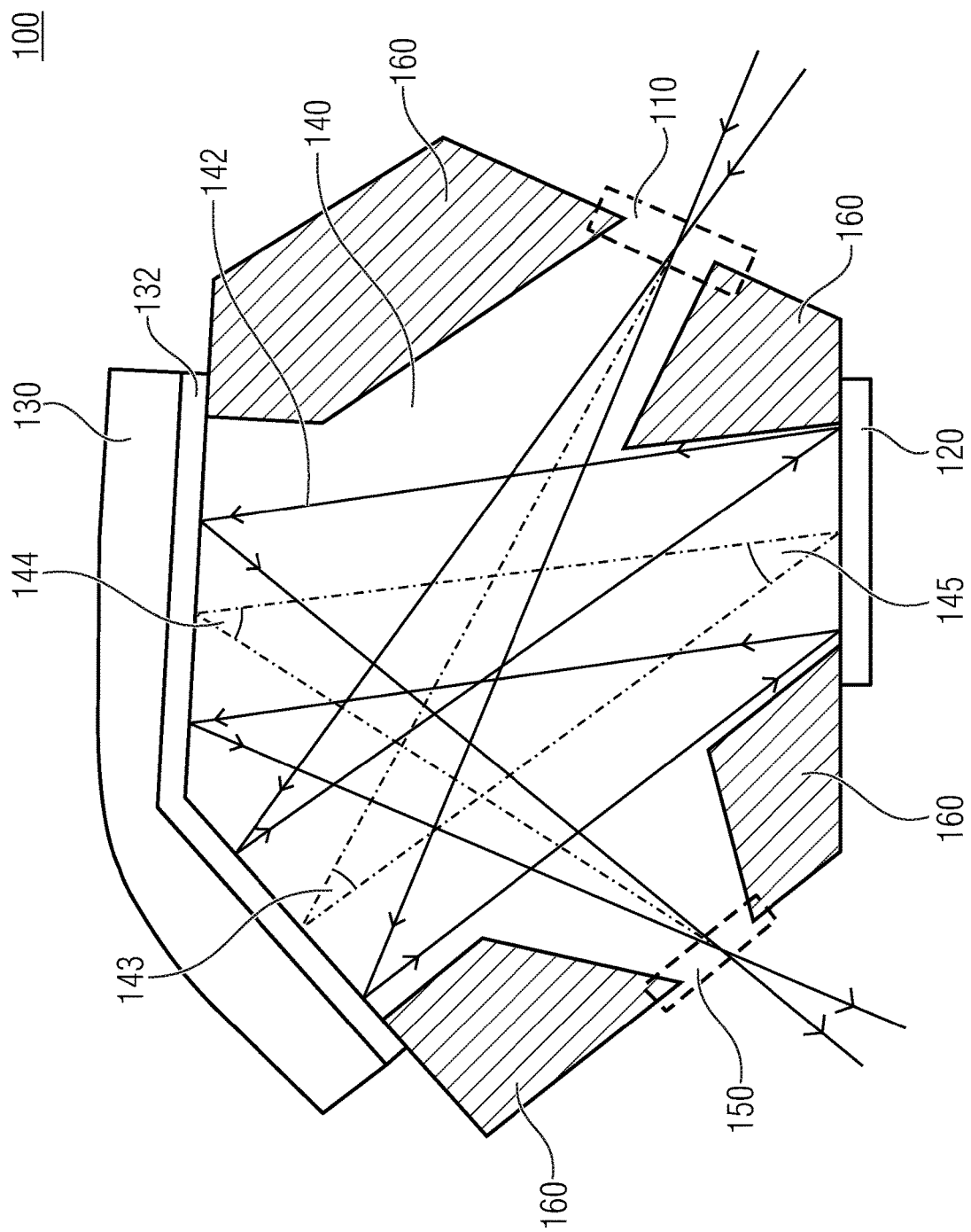
FIG. 1 is a schematic illustration of a spectrometer according to an embodiment of the present invention.

FIG. 1 shows a schematic illustration of a spectral analysis system 100, here also briefly referred to as a spectrometer 100 for capturing a spectrum according to an embodiment of the present invention. The spectrometer includes an inlet opening 110, a dispersive optical element 120 and a reflective imaging optic 130 having at least one optical functional element 132 defining a crossing optical path 142 from the inlet opening 110 across the dispersive optical element 120 to an outlet opening and/or a detector area 150 of the spectrometer 100 and a carrier member 160 defining a flat optical path volume 140 having at least one lateral opening. In FIG. 1, for example, four openings are shown. One opening corresponds to the inlet opening 110, the outlet opening and/or the detector area 150 is disposed at a further opening, the reflective imaging optics 130 is disposed at a third opening and the dispersive optical element 120 is disposed at a fourth opening. In the spectrometer 100, at least two of the inlet opening 110, the outlet opening and/or the detector surface 150, the at least one optical functional element 132 and the dispersive optical element 120 are integrated in at least two members. In that way, for example, the reflective imaging optics 130 is integrated in a first member and the dispersive optical element 120 in a second member. In other words, the reflective imaging optics 130 forms a first member and the dispersive optical element 120 forms a second member. The two members are mounted on the carrier member 160 at two of the four lateral openings, such that the optical path 140, projected along a thickness direction (z axis perpendicular to the paper plane) of the optical path volume 140 comprises crossing optical path portions. The at least two lateral openings are at an angle to each other. This means that the two openings are, for example, not parallel or perpendicular to one another.

The carrier member 160 can be a single member, e.g., from one mold. In that way, FIG. 1 shows, for example, a top view and the individual shaded elements of the carrier member are connected to one another, for example, via a bottom plate. The bottom plate limits, for example, the optical path volume on one side and can be perpendicular to the thickness direction. The elements of the carrier member 160 illustrated in a shaded manner can represent lateral walls that are connected to each other via the bottom (bottom plate) not illustrated in FIG. 1. The at least one lateral opening is disposed in at least one of the lateral walls. The expansion of the optical path volume 140 in thickness direction is, e.g., in a range of 3 mm to 30 mm, 3 mm to 20 mm, 3 mm to 10 mm or 3 mm to 5 mm, such as 4.5 mm.

According to an embodiment, the carrier member 160 can represent a molded body produced, e.g. by means of injection molding, 3D printing, metal investment casting, metal centrifugal casting or metal die casting. Here, the carrier member can be produced, e.g., as half-shell model. In that way, a very fast and precise production of the carrier member 160 suitable for mass-production is obtained, e.g. without additional steps for realizing the at least one opening. Half-shell models allow precise production and assembly since, e.g. between the half-shells, gaps can be realized for adjusting the half-shells with respect to one another and the members at openings of the carrier member 160. A further advantage of realizing the carrier member 160 by means of half-shell models is that the two half-shell models can comprise different materials and can hence also have different functional characteristics. According to an embodiment, the carrier member 160 can be produced by means of two-component injection molding, wherein, e.g., two different plastic materials, two different metal materials or a plastic material and a metal material are used.

According to an embodiment, the carrier member 160 can comprise, as a material, a metal material, such as an NF metal material (NF=non-ferrite) such as zinc, aluminium, magnesium, zinc alloy, magnesium alloy or aluminium alloy or plastic material. Metal material is particularly advantageous since it screens the optical path volume 140 from stray radiation from outside. According to an embodiment, dyes can be added in plastic materials, or surface modifications, such as surface coating or surface roughening can be performed in order to screen stray radiation from outside and/or to realize a stray radiation absorbing carrier member 160. Surface modifications can also be performed in a carrier member comprising metal material for reducing stray radiation within the spectrometer. Due to the fact that the carrier member 160 comprises, e.g., stray radiation absorbing material, influences by stray radiation can be minimized.

In one embodiment, the inlet opening and the outlet opening can be integrated in a common member or can be disposed on the same.

In one embodiment, the carrier member 160 has an aspect ratio lateral dimension/thickness of typically 1.5 or 2.5 or 3.5 or 5, at least 1.25. Absolute values for dimensions of the carrier member 160 can, for example, be less than 20×20×10 mm³, 10×10×6 mm³, 12×8×5 mm³, 8×8×6 mm³, 10×10×5 mm³ or 8×6×4 mm³. These values are exemplary, they represent different applications and embodiments (focal widths, resolutions, etc.). In that way, the spectrometer 100 can be considered as being miniaturized.

In one embodiment of the spectrometer 100, an angle 143, 144, 145 with an amount of between 10° and 120°, 10° and 110° or 10° and 100° lies between a first central ray of a beam of rays directed onto an optical functional element 132 of the reflective imaging optics 130 or the dispersive optical element 120 and a second central ray of a beam of rays radiated from the optical functional element 132 or the dispersive optical element 120. The central ray means, for example, a ray of a beam of rays lying on a symmetry axis of the beam of rays or having approximately the same distance to the outermost rays of the beam of rays, i.e., is in the center of the beam of rays. This allows minimization of the optical path volume and realization of the spectrometer with a small structural size.

In one embodiment of the spectrometer, the optical functional element 132 is a mirror, a lens or a combination of the same, such as a Mangin mirror. Thereby, electromagnetic radiation can be directed, collimated and/or expanded by simple means. Since mirror and lenses can be produced in a manner suitable for mass production and in a cost-effective manner, the spectrometer can also be produced in large quantities at little cost.

In one embodiment of the spectrometer, the optically effective area of the optical functional element 132 is a spherical, aspheric, torical and/or biconical area and/or free from area consisting of an axial or off-axial area portion, but an otherwise symmetrical area. In particular, spherical and cylindrical areas for the optical functional element 132 can be produced simply and cost effectively, for example by injection molding or glass molding, whereby the spectrometer can be produced cost effectively in large quantities.

In one embodiment of the spectrometer, the dispersive optical element 120 comprises an electrostatic, piezoelectric or electromagnetic or magnetostrictive drive for deflecting the dispersive optical element 120. By the drive, it is possible to adjust the dispersive optical element 120 such that the electromagnetic radiation of different wavelengths can be examined, since, depending on the angle of the dispersive element 120 relative to the optical functional element 132, beams of rays having differing wavelengths impinge on the outlet opening and/or detector area 150. An electrostatic, piezoelectric or electromagnetic drive can be controlled in a very fine manner whereby it is possible to spectrally split light with a miniaturized spectrometer and to analyze the same with high accuracy.

In one embodiment of the spectrometer, the dispersive optical element 120 comprises an optical or electric sensor for determining a deflecting position of the dispersive optical element 120. By the sensor, the deflection of the dispersive optical element 120 can, e.g., be determined exactly and thus the captured data can be analyzed very accurately with the miniaturized spectrometer.

In one embodiment of the spectrometer, the dispersive optical element 120 is a diffraction grading and/or configured in a moveable and/or rotatable manner. Diffraction gratings can be produced in a manner suitable for mass production and cost effectively and by a rotatable configuration electromagnetic radiation can be split variably.

Figure 2A:
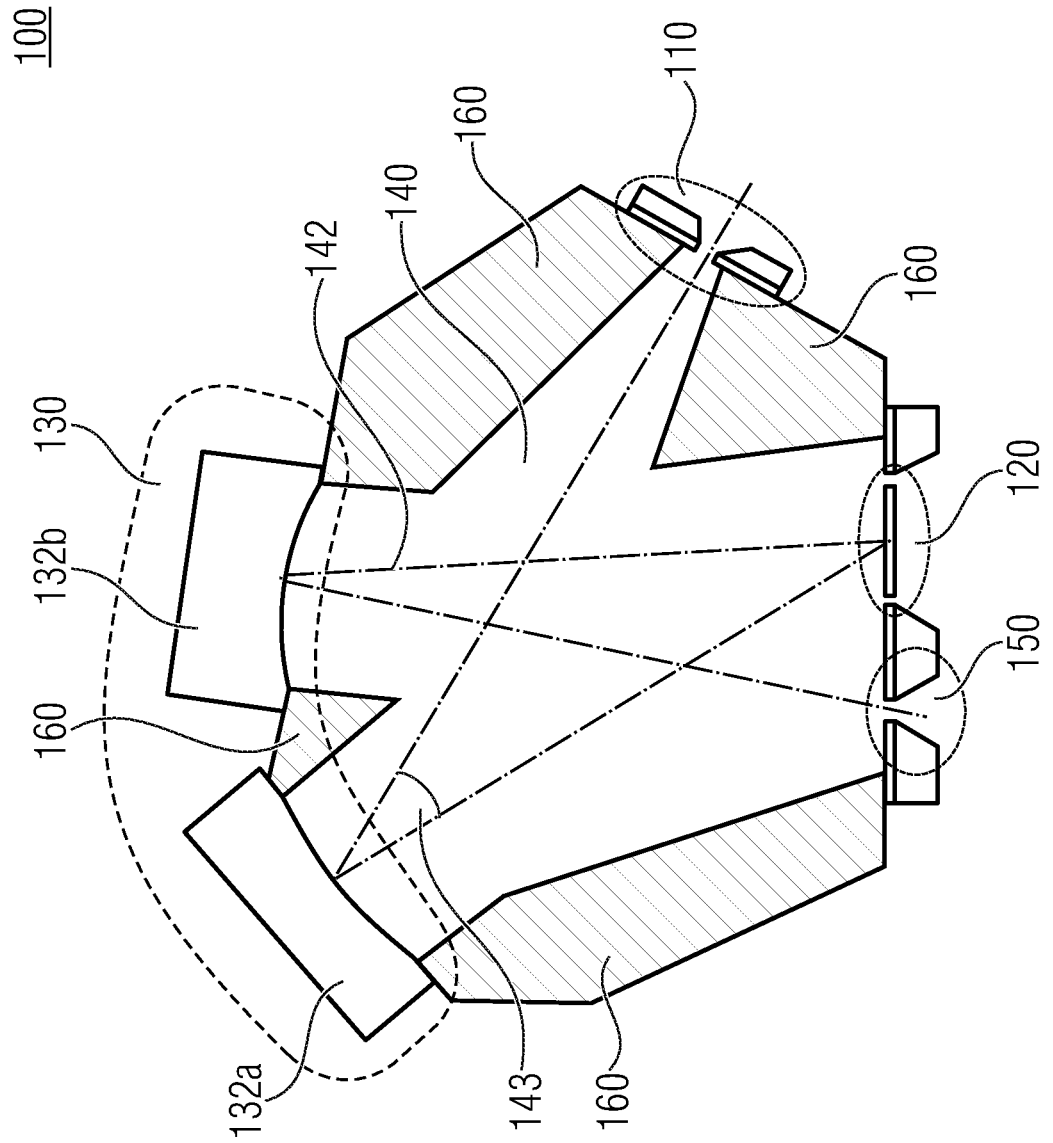
FIG. 2a is a schematic illustration of a spectrometer having two optical functional elements according to an embodiment of the present invention.
Figure 2B:
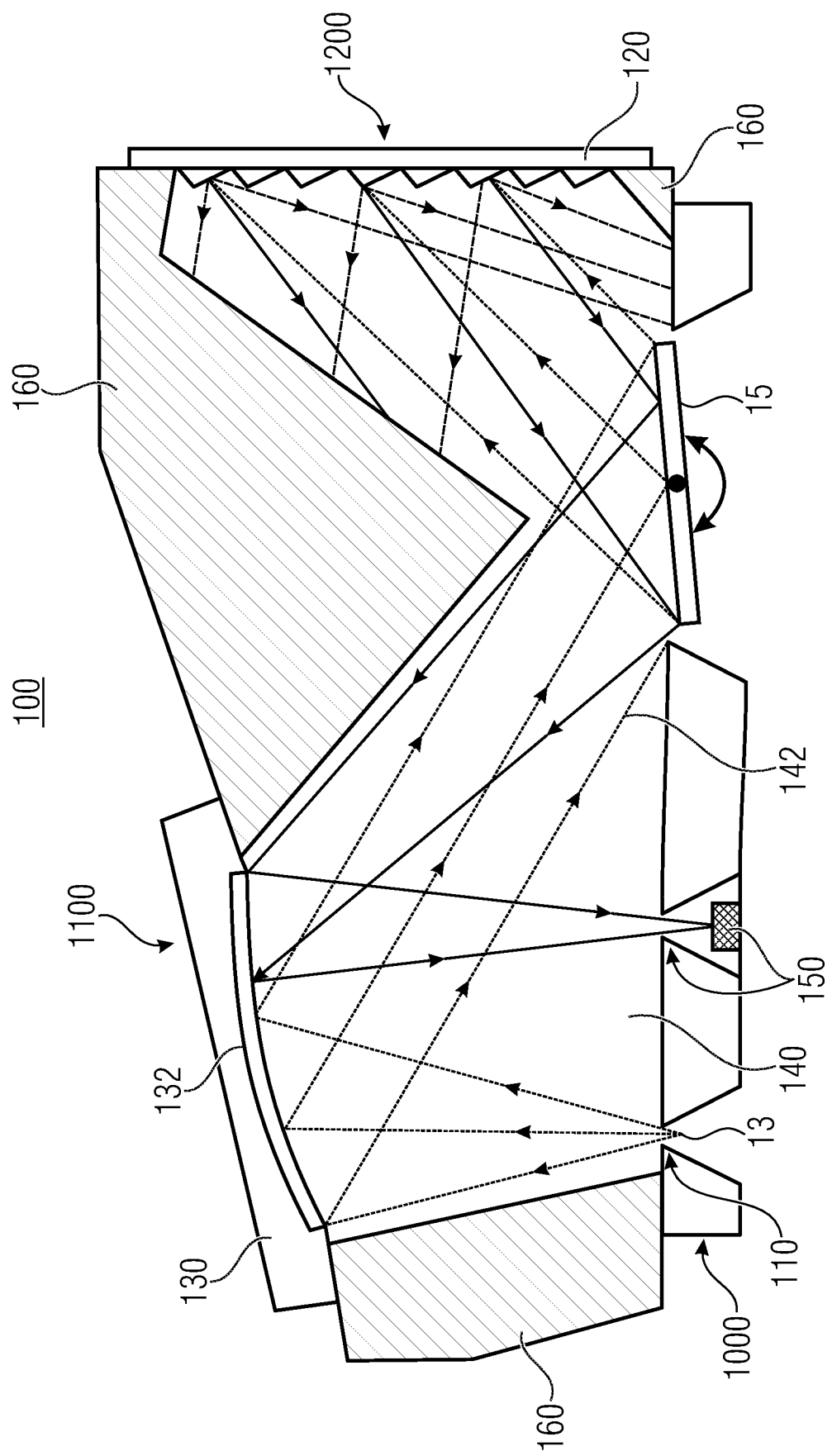
FIG. 2b is a schematic illustration of a spectrometer having a folded optical path and a fixed dispersive optical element according to an embodiment of the present invention.

According to an embodiment, the dispersive optical element 120 is configured in a static manner, wherein here, e.g., a scanning analysis as described in the context of FIG. 2b or no scanning analysis is performed.

According to an embodiment, during non-scanning analysis, the full spectrum is analyzed at the same time. Thus, for example, the full spectrum leaves the outlet opening and can be captured by a line detector or a planar detector. According to an embodiment, the static dispersive element 120 is, e.g., a reflective optical element or a transmitting optical element.

In one embodiment, the diffraction grating (dispersive optical element 120) is aberration corrected. This improves the spectral resolution of the spectrometer 100.

In one embodiment, the inlet opening 110, the outlet opening and/or detector area 150, the at least one optical functional element 132 and the dispersive optical element 120 are disposed directly or indirectly on the carrier member 160. Here, for example, the inlet opening 110 and the outlet opening and/or detector area 150 can be considered as indirectly disposed since the same are, for example, integrated directly into the carrier member. The reflective imaging optic 130 and the dispersive optical element 120 can, for example, be considered as indirectly disposed since the same are disposed, for example, as individual members on the carrier member.

According to an embodiment, the members are adhered at least partly on a side of the carrier member facing away from the optical path volume, i.e. an outer wall, or mounted in a different manner, such that the member is applied directly to the carrier member or the outer wall or adjacent to the same. Here, the member can be placed such that the optically effective element, such as the inlet opening 110, the outlet opening and/or detector area 150, the at least one optical functional element 132 and/or the dispersive optical element 120 is facing the optical path volume and is accessible for the optical path via at least one lateral opening.

For providing an adjustment buffer zone for compensating production variations of the carrier member, the outer wall is configured in a flat manner on the side, i.e. parallel to the extension of the outer wall, such that for placing the member before actually mounting the same, the member can be shifted transversally to the extension of the lateral opening.

FIG. 2a shows a schematic illustration of a spectrometer 100 having two optical functional elements according to an embodiment of the present invention. The spectrometer 100 includes an inlet opening 110, a dispersive optical element 120 and a reflective imaging optic 130 having two optical functional elements 132a and 132b defining an optical path 142 crossing from the inlet opening 110 across the dispersive optical element 120 onto an outlet opening 150 of the spectrometer. The two optical functional elements 132a and 132b can have the same features and functionalities as the optical functional element 132 in FIG. 1. However, the first optical functional element 132a does not have to show the same features and functionalities as the second optical functional element 132b. In that way, for example, the first optical functional element 132a can have the function of a collimator and the second optical functional element 132b can, for example, have the function of collimating a beam of rays. Further, the spectrometer 100 comprises a carrier member 160 defining a flat optical path volume 140 having four lateral openings. A first member corresponding to the inlet opening 110 is disposed on a first opening, a second member into which the second optical functional element 132b is integrated is disposed on the second opening, a third member into which the first optical functional element 132a is integrated is disposed on a third opening and a fourth member into which the outlet opening 150 as well as the dispersive optical element 120 are integrated is disposed on the fourth opening.

In one embodiment of the spectrometer 100, the inlet opening 110 is configured to allow electromagnetic radiation to enter in an optical path 142 of the spectrometer 100 and to direct the same onto a first optical functional element 132a of the reflective imaging optics 130. The first optical functional element 132a is configured, for example, to collimate the electromagnetic radiation and to direct the same onto the dispersive optical element 120. The dispersive optical element 120 is configured, for example, to spectrally split the electromagnetic radiation and to direct the same onto a second optical functional element 132b of the reflective imaging optics 130, wherein the electromagnetic radiation directed onto the second optical functional element 132 by the dispersive optical element 120 crosses the electromagnetic radiation directed onto the first optical functional element 132a from the inlet opening 110. The second optical functional element is configured, for example, to focus the electromagnetic radiation within an optical depth of field and to direct the same onto the outlet opening 150 and/or detector area, wherein the spectrally split electromagnetic radiation directed onto the outlet opening 150 and/or detector area by the second optical functional element 132b crosses the electromagnetic radiation directed onto the first optical functional element 132a from the inlet opening 110 as well as the electromagnetic radiation directed onto the dispersive optical element by the first optical functional element 132b. It is an advantage of this crossed optical path 142 that the spectrometer having a small optical path volume can be realized and can hence be produced with small structural size.

In one embodiment of the spectrometer 100, an angle 143 between a first beam of rays including electromagnetic radiation directed from the inlet opening 110 onto a first optical functional element 132a of the reflective imaging optics 130 and a second beam of rays including electromagnetic radiation directed onto the dispersive optical element 120 by the first optical functional element 132a is between 10° and 100°. Thereby, the optical path volume is minimized whereby spectrometers having small dimensions can be realized.

In one embodiment of the spectrometer 100, the outlet opening 150 or the detector area and the dispersive optical element 120 are configured monolithically as a common member. Since several components are integrated in one member, production of the spectrometer is simple and cost-effective since less members have to be produced and greater precision results since, as shown in FIG. 2a, two elements are produced exactly adjacent to one another in one member and do not have to be positioned subsequently with high precision. Thus, a common member for several elements of the spectrometer is advantageous for mass-production.

In other words, FIG. 2a shows a sectional view of a crossed Czerny-Turner monochromatic having the optical functional elements and the carrier member for holding the components. The gap and the MEMS grating are produced in silicon microtechnology. Additionally, the outlet gap and the grating are integrated in a common chip. The carrier member comprises respective contact surfaces for precise placement and fixing of the optical members. These contact surfaces are disposed, for example, on a lateral wall of the carrier member on a side facing away from the optical path and at least part of the members is adhered directly on these contact surfaces.

According to an embodiment, FIG. 2b shows an inventive spectral analysis system 100 which can also be referred to as spectroscopic apparatus. The spectroscopic apparatus 100 can comprise features and functionalities of the spectroscopic apparatus of FIG. 1. The spectroscopic apparatus 100 comprises an inlet opening 110 and an outlet opening and/or a detector area 150. Electromagnetic radiation 13 can enter through the inlet opening 110 into an interior (optical path volume 140) of the spectroscopic apparatus 100. Additionally, the electromagnetic radiation 13 can leave the outlet opening and/or detector area 150 from the interior of the spectroscopic apparatus 100. When passing through the respective openings 110, 150, the electromagnetic radiation 13 can be filtered, wherein filtering the radiation 13 can take place, for example, in the image plane, an aperture plane, a plane conjugated to the same or between these planes. Here, the radiation 13 can be filtered locally and/or spatially with respect to an object plane.

Further, the spectroscopic apparatus 100 comprises reflective imaging optics 130 having at least one optical functional element 132, referred to, e.g. as first mirror below. The reflective imaging optics 130 can be configured to influence the radiation 13 in a beam-forming manner. The first mirror can, for example, be a concave mirror. The first mirror can, for example, be a collimator mirror that is configured to collimate the radiation 13. The first mirror can, for example, be arranged in a fixed manner or can be configured in an unmovable manner.

Further, the spectroscopic apparatus 100 comprises a movable MEMS mirror 15. The movable MEMS mirror 15 can be configured as micromechanical member and can have dimensions in the range of several millimeters. The MEMS mirror 15 can be structured by means of microstructuring methods (e.g. lithography, etching technologies, etc.) into a suitable substrate. The MEMS mirror 15 comprises a rotating or tilting axis 16. The MEMS mirror 15 can be rotated or tilted around this rotation or tilting axis, which is indicated by means of the double arrow 17.

According to an embodiment, the spectral analysis system 100 comprises an electrostatic, piezoelectric, electromagnetic or magnetostrictive drive for deflecting the MEMS mirror 15.

According to an embodiment, the spectral analysis system 100 comprises an optical or electric sensor for determining a deflection position of the MEMS mirror 15.

Electromagnetic radiation 13 can be reflected by the first mirror (the optical functional element 132) and be guided to the movable MEMS mirror 15, wherein the radiation 13 is at the same time influenced in a beam-forming manner by the first mirror. The radiation 13 influenced in a beam forming manner reaches the movable MEMS mirror 15 and can be reflected again there. According to the invention, the radiation is reflected by the MEMS mirror 15 to a dispersive optical element 120 arranged in a spatially separate manner from the MEMS mirror 15. The dispersive optical element 120 can, for example, be an optical diffraction grating, a prism or a photonic crystal.

The dispersive optical element 120 can be produced as element produced in microsystem technology, possibly even in combination but also by molding methods or other replication technologies. The dispersive optical element 120 is arranged in a stationary manner or configured in an unmovable manner. Thus, the movable MEMS mirror 15 is movable in relation to the dispersive optical element 120 arranged in a stationary manner or, more accurately, rotatable or tiltable. Thus, FIG. 2b shows a scanning spectral analysis with an unmovable dispersive optical element 120.

The dispersive optical element 120 is configured to spectrally split the radiation 13 influenced in a beam-forming manner by the first mirror and reflected by the movable MEMS mirror 15 into different orders of diffraction. Here, the dispersive optical element 120 has a wavelength-selective effect, i.e. the incoming radiation 13 is split into different wavelengths, wherein radiation portions of a desired wavelength or a desired wavelength range are selectively reflected at a specific angle.

The portions of the radiation 13 split into a limited wavelength range by means of the dispersive optical element 120 are reflected back to the movable MEMS mirror 15 by the dispersive optical element 120. The spectrally split radiation with the limited wavelength range is again reflected from the movable MEMS mirror 15 to the optical functional element 132.

Alternatively, instead of the individual optical functional element 132, two optical functional elements can exist as shown and described in FIG. 2a.

By means of the optical functional element 132, the spectrally split radiation 13 with the limited wavelength range can be refocused onto the outlet opening and/or detector area 150.

The exemplarily described arrangement of the individual elements with respect to one another results in the shown optical path, wherein the propagation direction of the electromagnetic radiation 13 along this optical path is indicated by arrows.

Here, it can be seen, among others, that the radiation reflected by the movable MEMS mirror 15 to the dispersive optical element 120 is split at exactly this dispersive optical element 120. One portion of the radiation 13 comprising a limited but desired wavelength range (e.g. a first order maximum) is reflected back to the MEMS mirror 15. Other portions of the radiation 13 whose wavelengths are outside the desired wavelength range are filtered out. For example, such a portion of the radiation 13 is directed in a direction of the MEMS mirror 15 but bypassed laterally along the MEMS mirror 15. Another part of the radiation 13 can be guided, for example, to an inner wall of a carrier member 160 of the spectrometer which can serve, e.g., as radiation absorption element in which the radiation 13 is absorbed at the inner wall. The radiation-absorbing inner wall of the carrier member 160 can be arranged opposite to the main reflection area of the MEMS mirror 15.

All above-stated elements of the spectroscopic apparatus 100, i.e. the movable MEMS mirror 15, the inlet opening 110, the outlet opening and/or detector area 150 and the dispersive optical element 120 have to be carefully aligned with respect to one another in spectroscopic apparatuses according to conventional technology, which is also referred to as alignment. For keeping the alignment effort as low as possible, according to the invention, the movable MEMS mirror 15 in the inventive spectroscopic apparatus 100 is configured with the inlet opening 110 and/or the outlet opening and/or detector area 150 monolithically as a first common member 1000. Optionally, the first common member 1000 can further comprise the fixed dispersive optical element 120, whereby, e.g. the lateral wall of the carrier member 160 between the MEMS mirror 15 and the dispersive optical element 120 can be omitted.

Further, the carrier member 160 is produced of one mold, wherein only lateral walls (shaded areas of the carrier member 160) are illustrated that are connected via a bottom (not visible in FIG. 2b). Thus, the carrier member 160 comprises a substrate including a bottom and lateral walls. Here, the bottom is arranged, e.g., parallel to an optical path 142 and the lateral walls are arranged, e.g. perpendicular to the optical path 142.

According to FIG. 2b, the carrier member 160 comprises three lateral openings in the lateral walls where, e.g., one member can be fixed from the outside. Thus, the first common member 1000 can be disposed on one of the three openings, the member 1100 including the reflective imaging optics 130 with the first optical element 132a can be arranged on another opening and a third member including the fixed dispersive optical element 120 can be disposed on a further one of the three openings. Thus, the carrier member 160 already determines the positions of the members, whereby a very exact spectroscopic apparatus can be realized in a miniaturized manner with a simple pick-and-place method.

According to an embodiment, it is possible that the movable MEMS mirror 15 and the inlet opening 110 and/or the outlet opening and/or detector area 150 are configured in the same substrate which would correspond to an above-mentioned monolithic configuration. Alternatively or additionally, it would be possible that the movable MEMS mirror 15 and the dispersive optical element 120 are configured in the same substrate which would also correspond to an above-mentioned monolithic configuration. The MEMS mirror 15 can be structured or configured, for example, with the inlet opening 110 and/or the outlet opening and/or detector area 150 and/or the dispersive optical element 120 on a common chip.

The optical path 142 illustrated in FIG. 2b is, e.g., folded. Therefore, the spectrometer 100 can also be referred to as folded Czerny-Turner spectrometer.

Figure 2C:
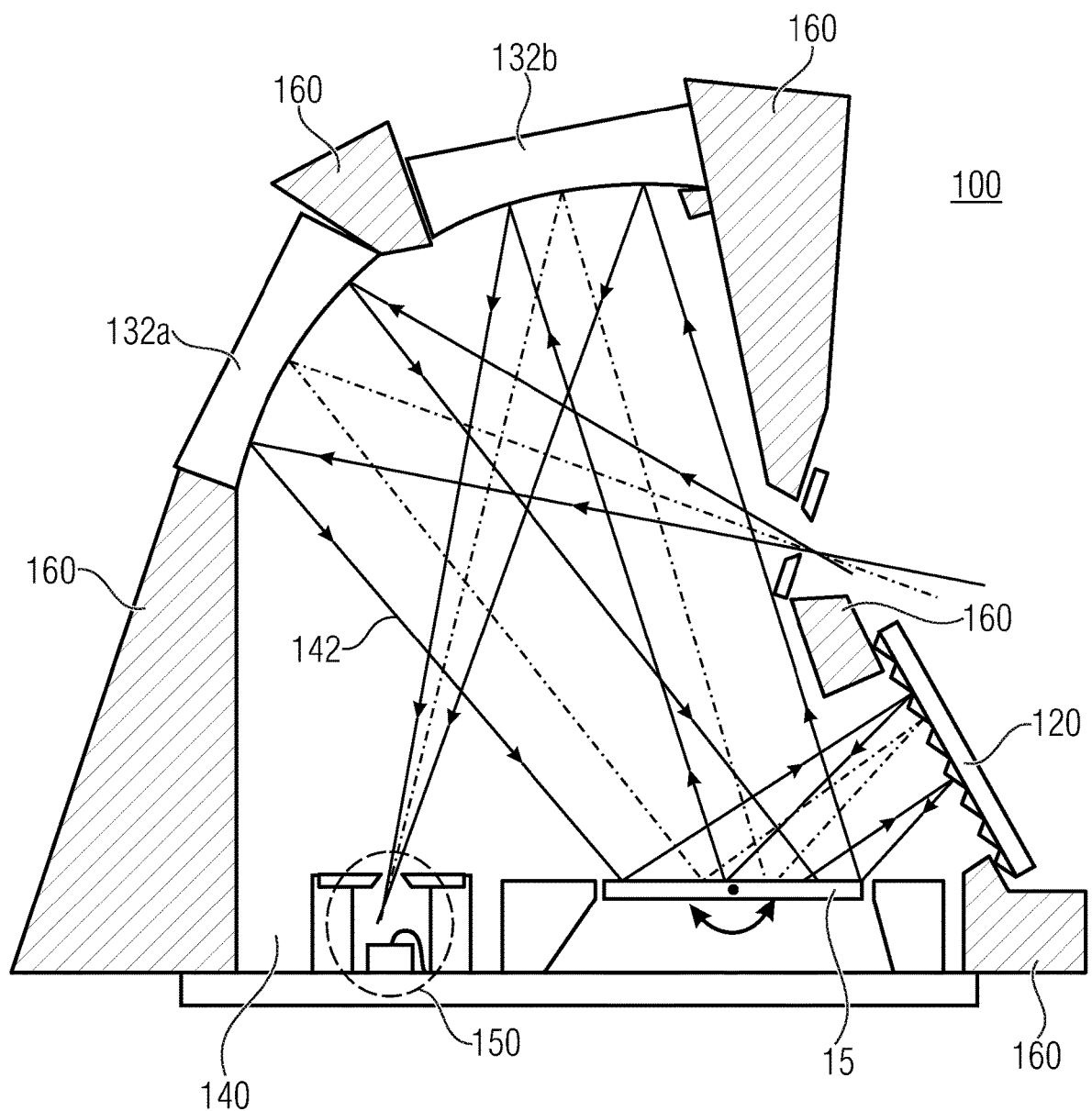
FIG. 2c is a schematic illustration of a spectrometer having a crossed optical path and a fixed dispersive optical element according to an embodiment of the present invention.
Figure 2D:
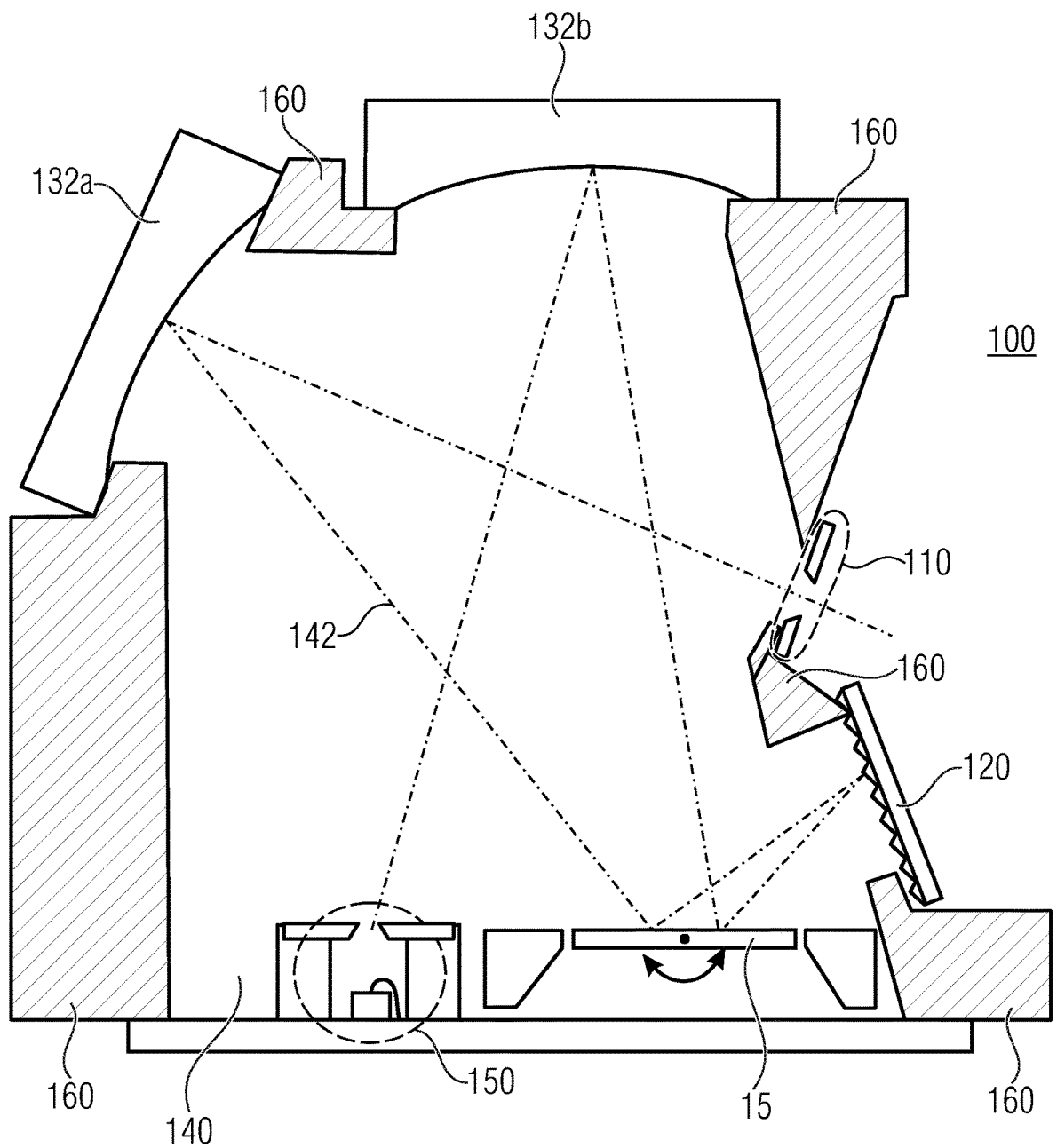
FIG. 2d is a schematic illustration of a spectrometer having a crossed optical path and a fixed dispersive optical element according to an alternative embodiment of the present invention.

In contrary to that, FIG. 2c and FIG. 2d illustrate a crossed optical path 142 also with a fixed dispersive element 120. Thus, the spectrometer 100 in FIG. 2c and FIG. 2d can be referred to as crossed Czerny-Turner spectrometer.

The spectrometer 100 illustrated in FIG. 2c and FIG. 2d can comprise features and functionalities of the spectrometer of FIG. 2b. The spectrometer 100 in FIG. 2c and FIG. 2d comprises a first optical functional element 132a and a second optical functional element 132b. The spectrometer 100 in FIG. 2c and FIG. 2d differs from the spectrometer 100 in FIG. 2b in that the radiation directed from the second optical functional element 132b to the outlet opening and/or detector 150 crosses the radiation directed from the inlet gap 110 onto the first optical functional element 132a.

The inlet opening 110 is configured, e.g., to allow electromagnetic radiation to enter in an optical path 142 of the spectral analysis system 100 and to direct the same onto the first optical functional element 132a of the reflective imaging or beam-forming optics 130. The first optical functional element 132a is configured to collimate the electromagnetic radiation and to direct the same onto the dispersive optical element 120, wherein the radiation can be directed via a movable mirror 15. The dispersive optical element 120 is configured to spectrally split the electromagnetic radiation and to direct the same onto a second optical functional element 132b of the reflective imaging or beam-forming optics 130, wherein the electromagnetic radiation directed onto the second optical functional element 132 by the dispersive optical element 120 crosses the electromagnetic radiation directed onto the first optical functional element 132a from the inlet opening 110 and can also be directed via the movable mirror 15.

The second optical functional element 132b is configured, e.g., to focus the electromagnetic radiation within an optical depth of field and to direct the same onto the outlet opening 150 and/or detector area. The spectrally split electromagnetic radiation directed onto the outlet opening 150 and/or detector area by the second optical functional element 132b crosses the electromagnetic radiation directed onto the first optical functional element 132a from the inlet opening 110 as well as the electromagnetic radiation directed onto the dispersive optical element by the first optical functional element 132b.

Depending on the arrangement of the individual components on a carrier member 160 of the spectrometer 100, different optical paths 142 can be realized. Here, according to an embodiment, devices such as the first optical functional element 132a and/or the second optical functional element 132b can be fixed to outer contact surfaces facing away from the optical path volume 140 (see, e.g., FIG. 2d) or on lateral walls of the openings (see FIG. 2c).

By means of the movable mirror 15, a scanning spectrometer 100 is realized despite stationary dispersive element 120. Thus, large array detectors can be omitted. The movable mirror 15 can be produced in (silicon) micro or precision engineering technology and can hence represent an MEMS mirror.

Figure 3:
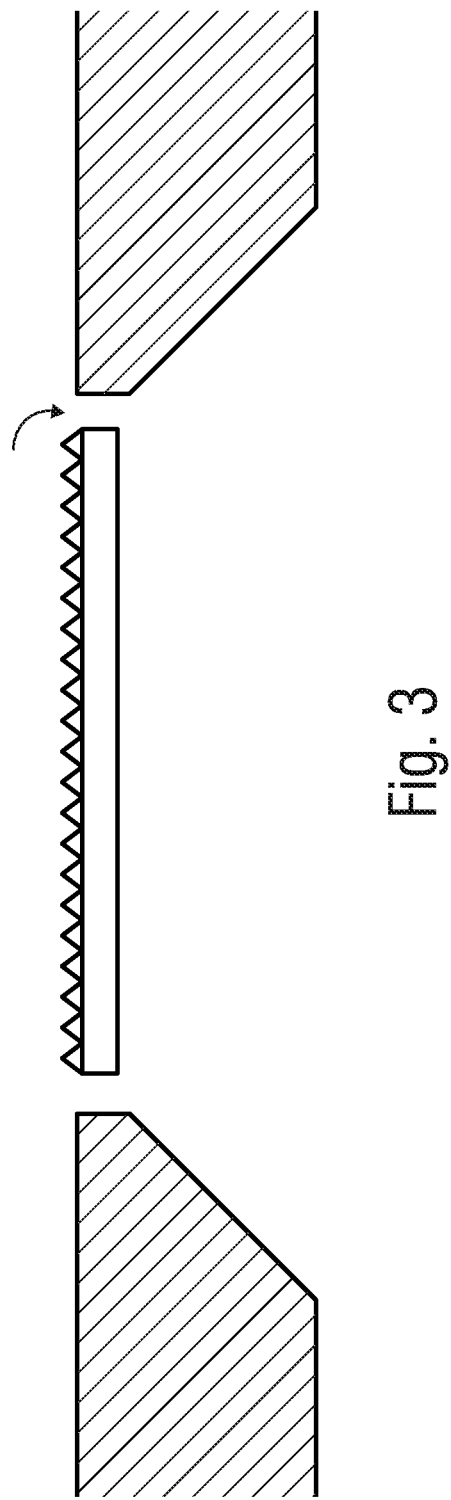
FIG. 3 is a schematic illustration of a dispersive optical element for the spectrometer according to an embodiment of the present invention.

FIG. 3 shows a schematic illustration of a dispersive optical element 120 for the spectrometer according to an embodiment of the present invention. The dispersive optical element 120 is pivoted and realized as diffraction grating. In other words, FIG. 3 shows a sectional view of an MEMS grating mirror produced in silicon microtechnology.

FIG. 4 shows a schematic representation of an MEMS gap 200 produced in silicon microtechnology for the spectrometer according to an embodiment of the present invention. The MEMS gap 200 can, for example, be used as inlet opening (such as the inlet opening 110 in FIG. 1 and FIG. 2a) or as outlet opening (such as the outlet opening 150 in FIG. 1 and FIG. 2a).

FIG. 5 shows a schematic illustration of a gap 200 produced by means of laser material processing in metal for the spectrometer according to an embodiment of the present invention.

In one embodiment, the inlet opening and/or the outlet opening is produced by means of a laser material processing or a replicating technology. Thereby, exact openings can be produced which increases the resolution capacity of the spectrometer.

Figure 6:
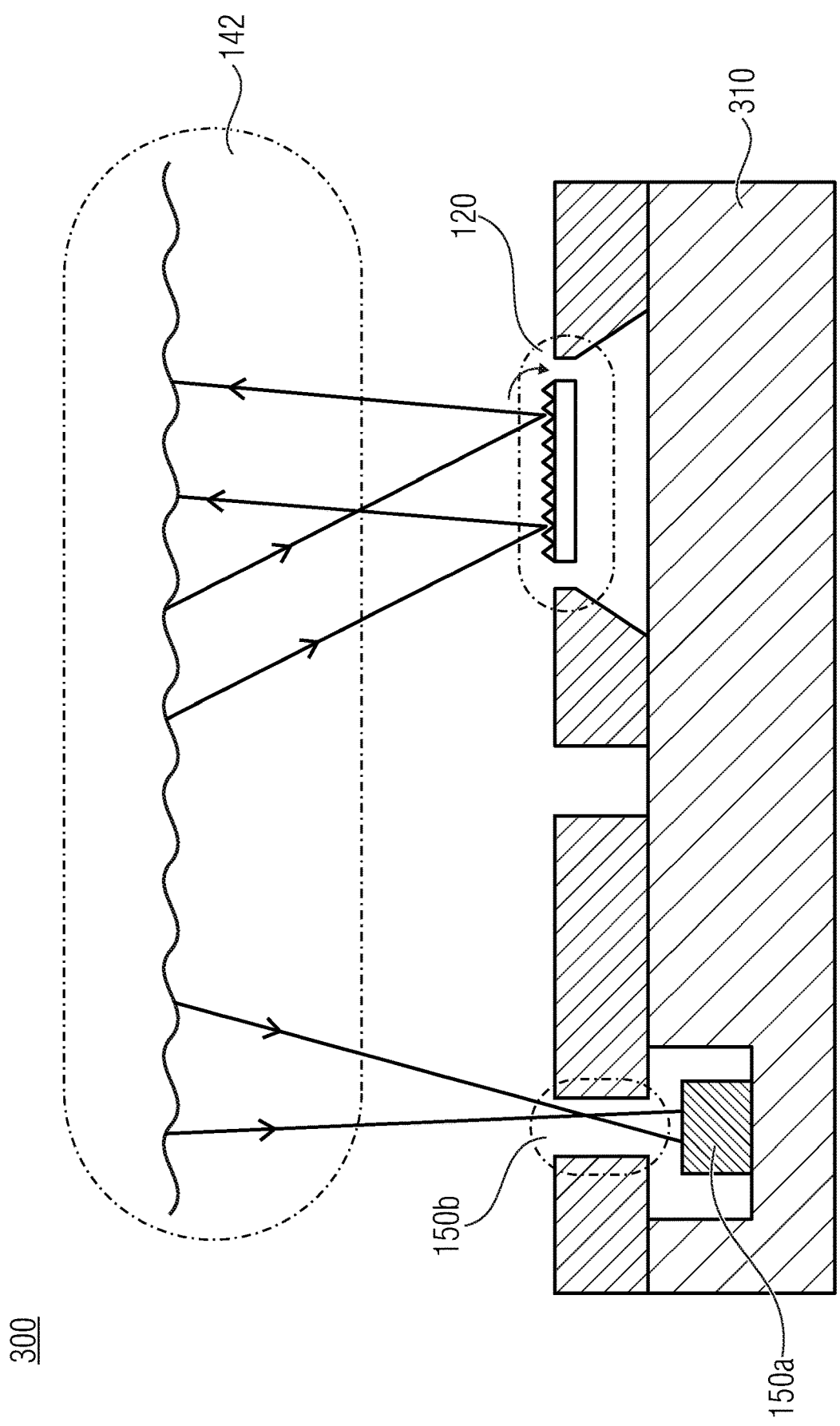
FIG. 6 is a schematic illustration of a member of the spectrometer according to an embodiment of the present invention.

FIG. 6 shows a schematic illustration of a member 300 of the spectrometer according to an embodiment of the present invention. A detector area 150a, an outlet opening 150b and a dispersive optical element are integrated in the member 300. The outlet opening 150b, the detector area 150a and the dispersive optical element 120 are disposed, for example, on a common wiring carrier 310, whereby the three elements can be advantageously connected to one another and exactly positioned with respect to one another. However, in one embodiment it is also possible that the outlet opening 150b or the detector area 150a and dispersive optical element 120 are disposed, for example, on a common wiring carrier 310.

In one embodiment, the detector area 150a detects the electromagnetic radiation leaving the optical path 142 of the spectrometer through the outlet opening 150b in a spectrally split manner. By combining the outlet gap with the detector area, beams of rays having a different wave length than the wavelength to be analyzed can be easily sorted out.

In one embodiment, the detector area comprises an active area, wherein the active area can act as outlet gap. In that case, the active area has, for example, a rectangular shape of a suitable size which would make a separate outlet gap obsolete. If, for example, no outlet gap but only a detector area 150a is used, the detector area 150a has to be designed such that its expansion does not also detect beams of rays having a different wavelength than the one to be analyzed.

In other words, FIG. 6 shows a sectional view of an MEMS grating mirror (dispersive optical element 120) produced in silicon microtechnology adjacent to an outlet gap 150b produced by means of laser material processing in metal. Both members are mounted on the same wiring carrier 310. A detector (detector 150a) results for detecting the spectrally split electromagnetic radiation coming out through the outlet gap 150b is additionally placed in a cavity on the wiring carrier 310.

Figure 7:
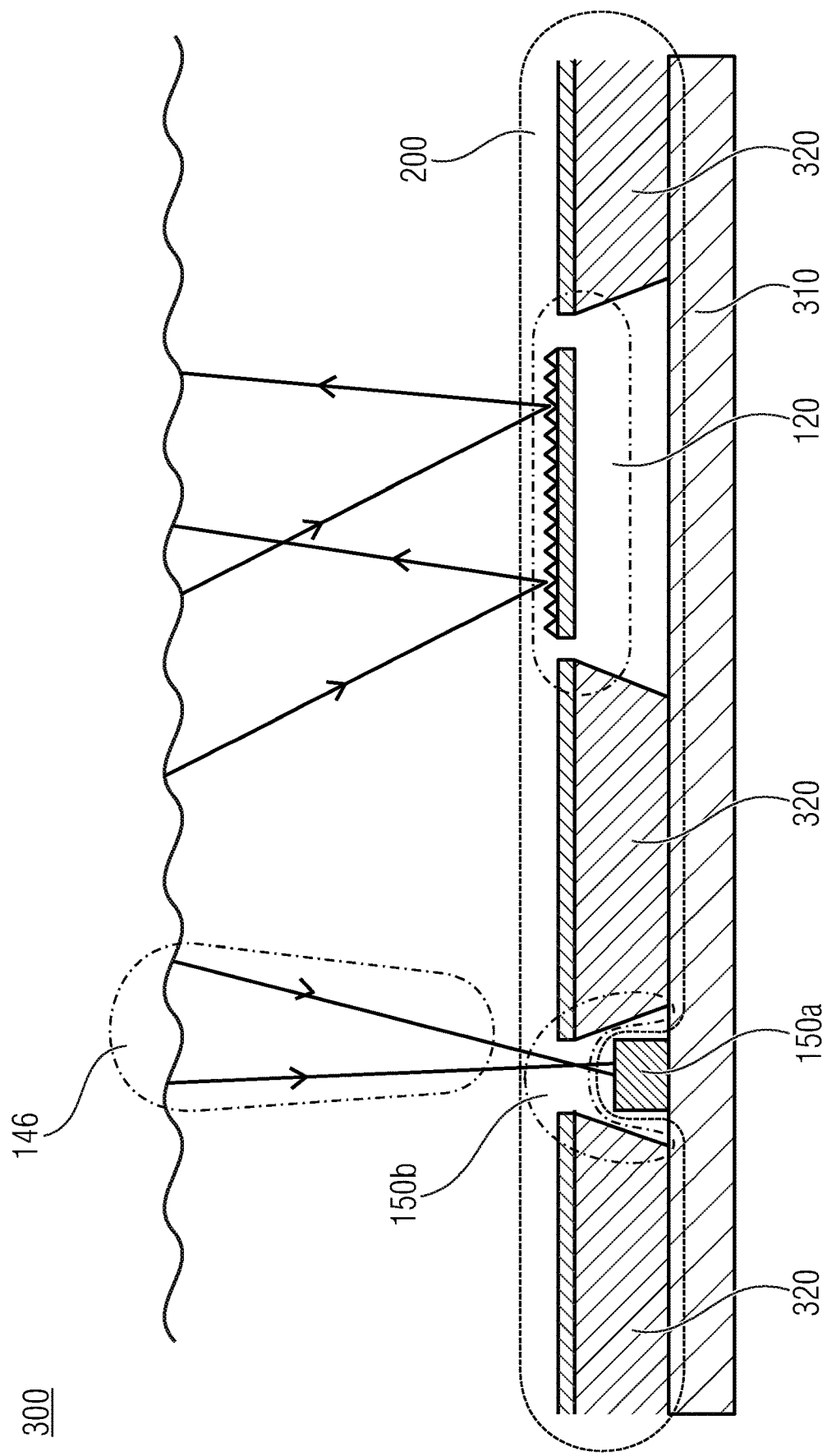
FIG. 7 is a schematic illustration of a member of the spectrometer into which both an outlet gap as well as a dispersive element are integrated, according to an embodiment of the present invention.

FIG. 7 shows a schematic illustration of a member 300 of the spectrometer into which both an outlet gap 150b, a detector area 150a as well as a dispersive element 120 are integrated according to an embodiment of the present invention. The outlet gap 150b, the detector area 150a as well as the dispersive element 120 are disposed on a wiring carrier 310.

In other words, FIG. 7 shows a sectional view of an MEMS grating mirror (dispersive element 120) produced in silicon microtechnology where the outlet gap 150b is integrated in the same substrate 320. The MEMS member 200 is mounted on the wiring carrier 310. A detector (detector area 150a) for detecting the spectrally split electromagnetic radiation 146 passing through the outlet gap 150b is, for example, additionally placed on the wiring carrier 310.

Figure 8:
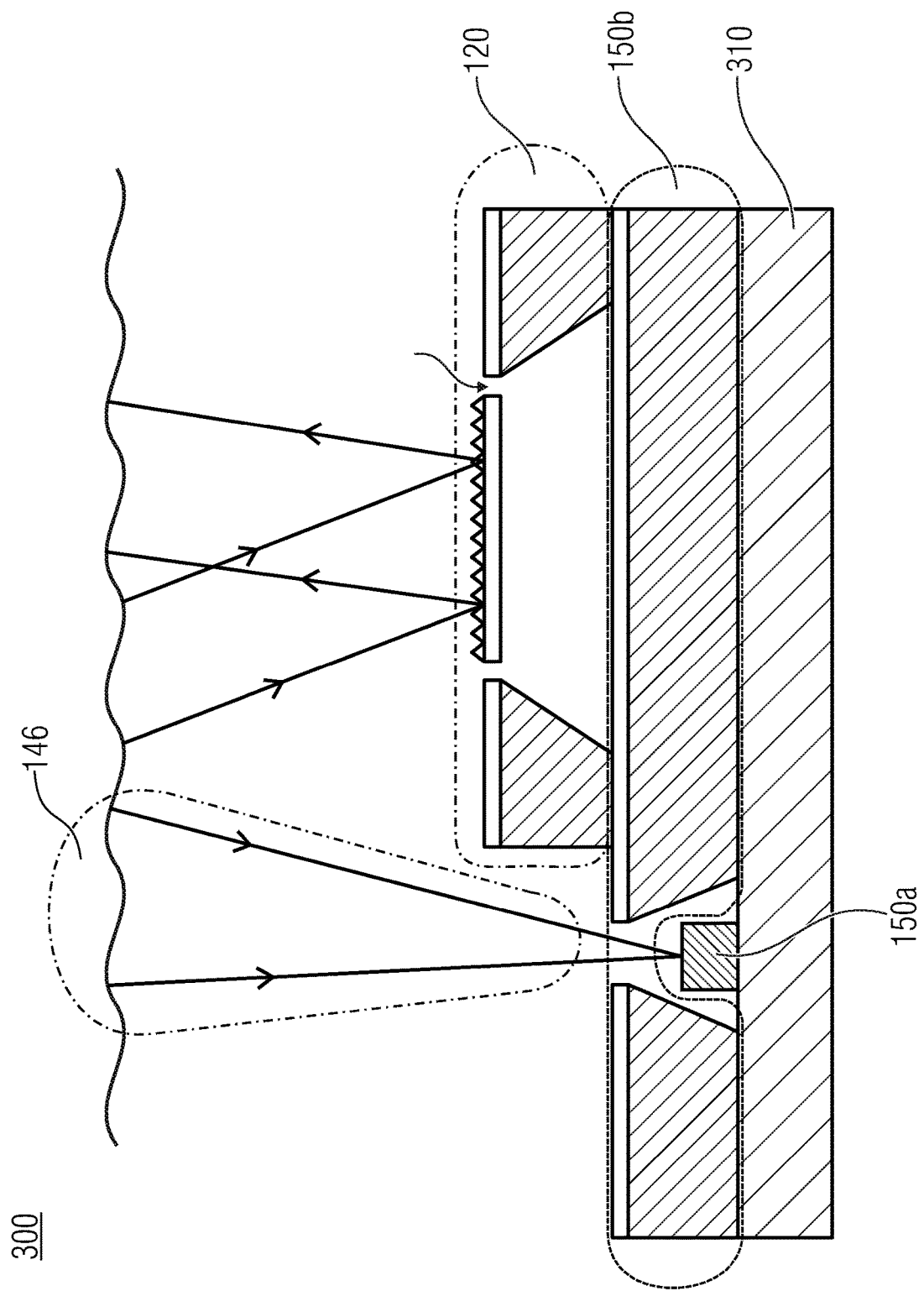
FIG. 8 is a schematic illustration of two members of the spectrometer that are arranged on top of one another according to an embodiment of the present invention.

FIG. 8 shows a schematic illustration of two members, a dispersive optical element 120 and an outlet gap 150b forming a member 300 of the spectrometer with a wiring carrier 310 and a detector area 150a and which are arranged on top of one another according to an embodiment of the present invention.

In other words, FIG. 8 shows, for example, a sectional view of an MEMS grating mirror (dispersive optical element 120) produced in silicon microtechnology which is mounted on an MEMS outlet gap 150b produced in silicon microtechnology. The member with outlet gap 150b is mounted on a wiring carrier 310. A detector (detector area 150a) for detecting the spectrally split electromagnetic radiation 146 passing through the outlet gap 150b, is, for example, additionally placed on the wiring carrier 310.

Figure 9:
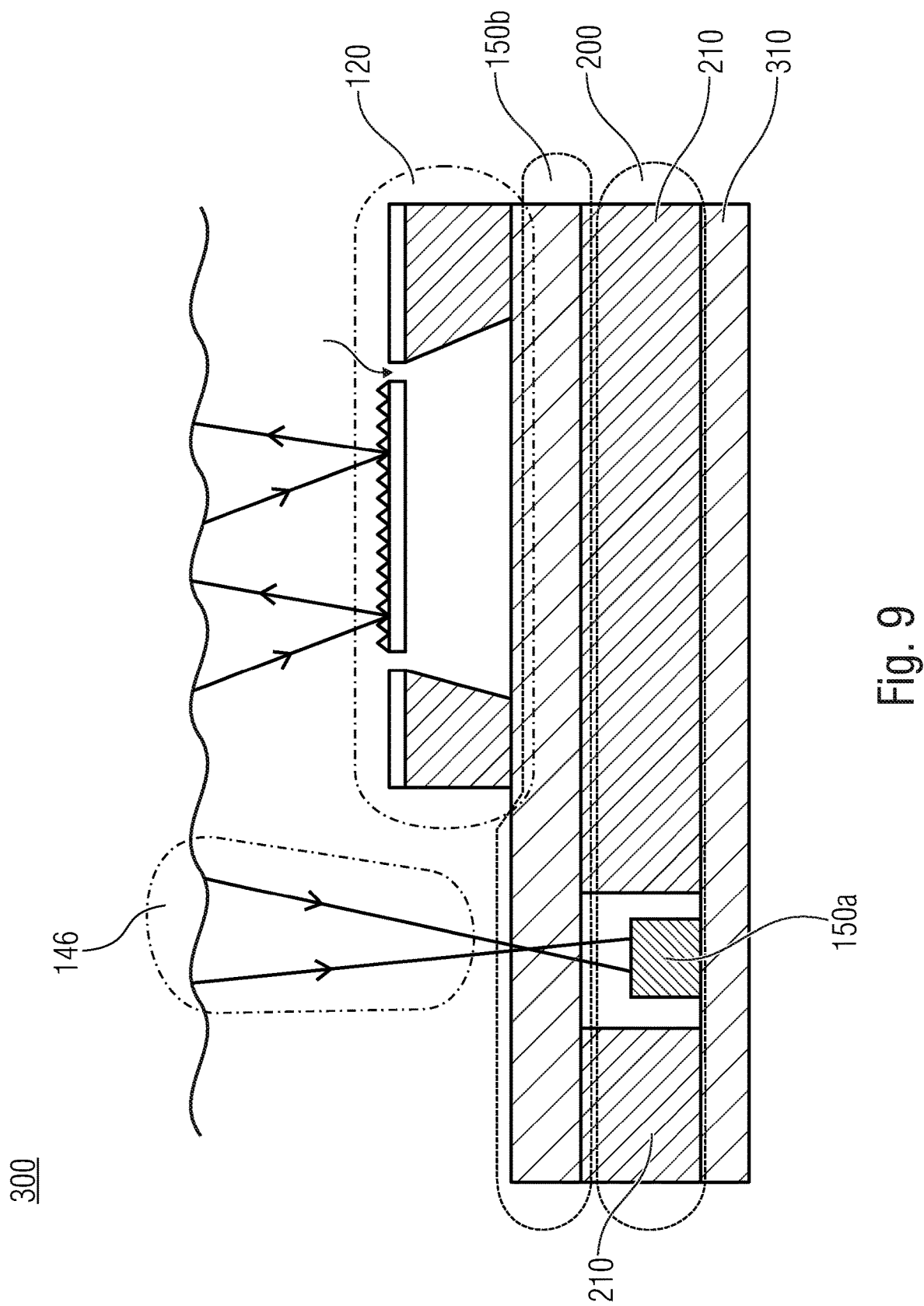
FIG. 9 is a schematic illustration of three members of the spectrometer that are arranged above one another according to an embodiment of the present invention.

FIG. 9 shows a schematic illustration of three members, a dispersive optical element 120, an outlet gap 150b and a member 200 with integrated detector area 150a forming a member 300 of the spectrometer together with a wiring carrier 310, wherein the three members are arranged on top of one another on the wiring carrier 310 according to an embodiment of the present invention.

In other words, FIG. 9 shows, for example, a sectional view of an MEMS grating mirror (dispersive optical element 120) produced in silicon microtechnology which is mounted on an outlet gap 150b produced by means of laser material processing in metal. The member with outlet gap 150b is mounted, for example, on the member 200 and the member 200 is disposed, for example, on the wiring carrier 310. In one embodiment, the substrate 210 of the member 200 is monolithically connected to the wiring carrier 310 to one member "from one mold". In this embodiment, for example, the member with outlet gap 150b is mounted on the wiring carrier 310 and a detector (detector area 150a) for detecting the spectrally split electromagnetic radiation 146 passing through the outlet gap 150b is additionally placed in a cavity on the wiring carrier 310.

The members 300 of FIG. 6, FIG. 7, FIG. 8 and FIG. 9 can have, for example the same features and functionalities and can be mounted on a carrier member of a spectrometer described herein at one of the at least two lateral openings, such that the optical path, projected along a thickness direction of the optical path volume, comprises crossing optical path portions.

Figure 10:
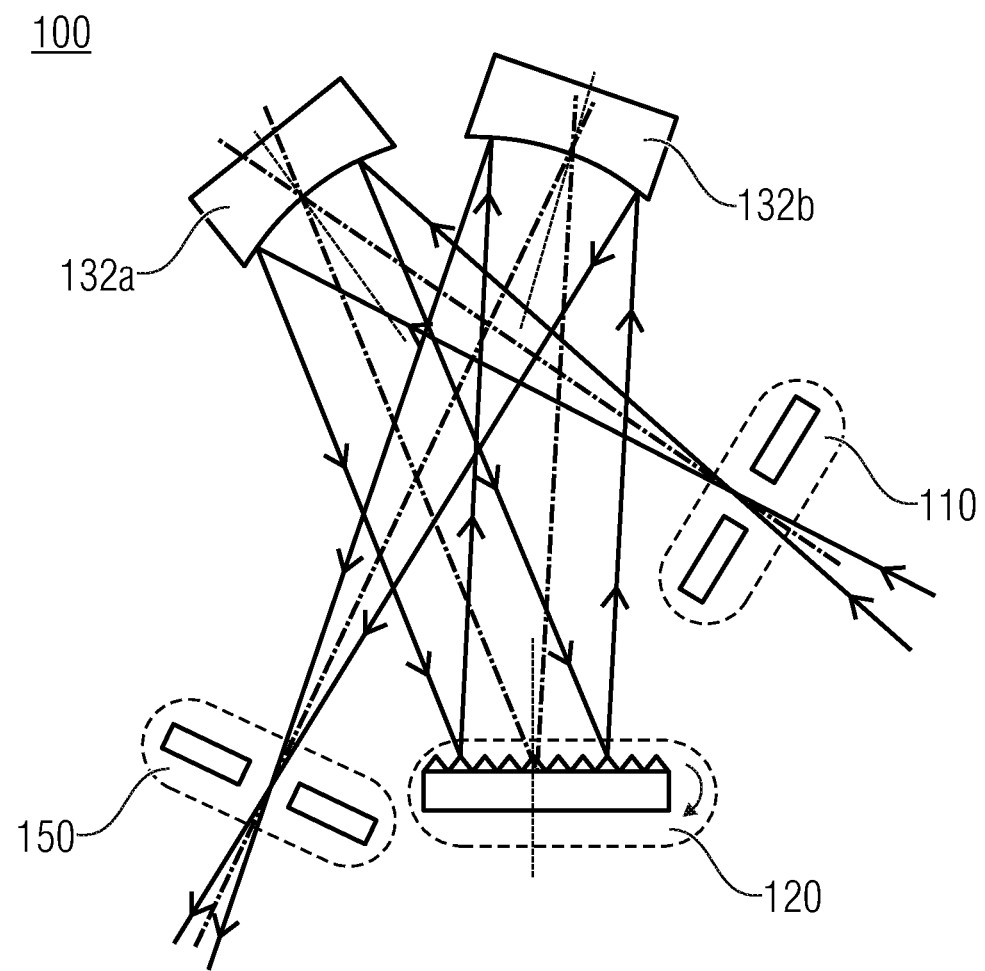
FIG. 10 a schematic illustration of the spectrometer without illustration of the carrier member according to an embodiment of the present invention.

FIG. 10 shows a schematic illustration of the spectrometer 100 without illustration of the carrier member according to an embodiment of the present invention. FIG. 10 shows the schematic view of a crossed Czerny-Turner monochromator, e.g., with the respective beams of rays from the inlet gap 110 across the optical functional elements to the outlet gap 150. The spectrometer 100 comprises a dispersive optical element 120, a first optical reflective element 132a and a second optical reflective element 132b.

Figure 11:
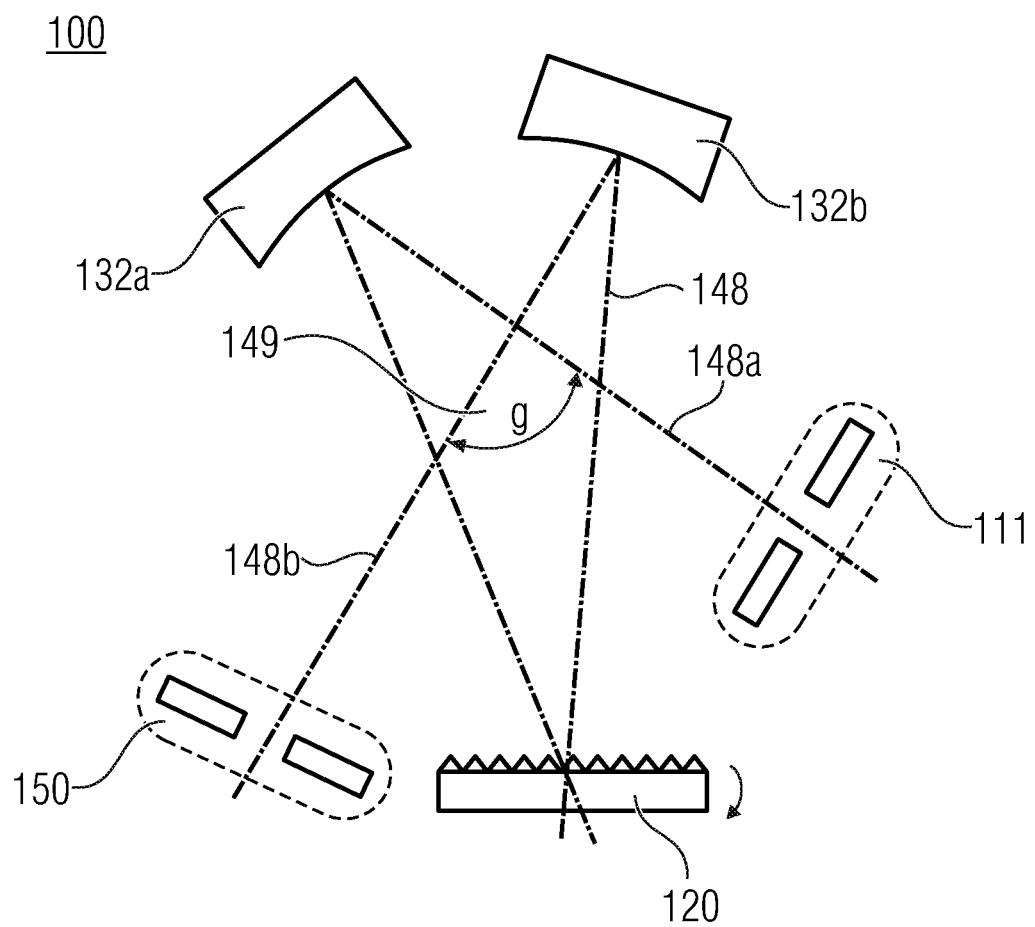
FIG. 11 is a schematic illustration of the course of the optical path of the spectrometer according to an embodiment of the present invention.

FIG. 11 shows a schematic illustration of the course of the optical path of the spectrometer 100 according to an embodiment of the present invention. FIG. 11 shows the schematic view of a crossed Czerny-Turner monochromator, for example with indicated main or central rays 148 of the beams of rays. The spectrometer 100 comprises an inlet gap 110, a dispersive optical element 120, a first optical reflective element 132a, a second optical reflective element 132 and an outlet opening and/or detector area 150.

In one embodiment, an angle 149 between a first central ray 148a of a beam of rays passed through the inlet opening and a second central ray 148b of a beam of rays impinging on the outlet opening is between 10° and 120°. The angle 149 between the main rays of the optical path portions between inlet gap and first mirror and second mirror and outlet gap can also be in a range of 10° to 120°, 10° to 100° or 10° to 90°. Thus, the spectrometer 100 can be a Czerny-Turner MEMS spectrometer. By the specific structure, a miniaturized MEMS spectrometer 100 can be realized.

In one embodiment, all angles 143, 144, 145 and 149 illustrated in FIGS. 1, 2 and 11 can also be in a range of 10° to 90°, 10° to 80°, 10° to 70° or 10° to 60°, such as at 45°.

In the following, further embodiments of the spectrometer are discussed where the optical path comprises a greater expansion into the thickness direction of the spectrometer compared to the above embodiments due to the usage of deflection mirrors. By the deflection mirrors, the optical path can be placed in several planes.

Figure 12:
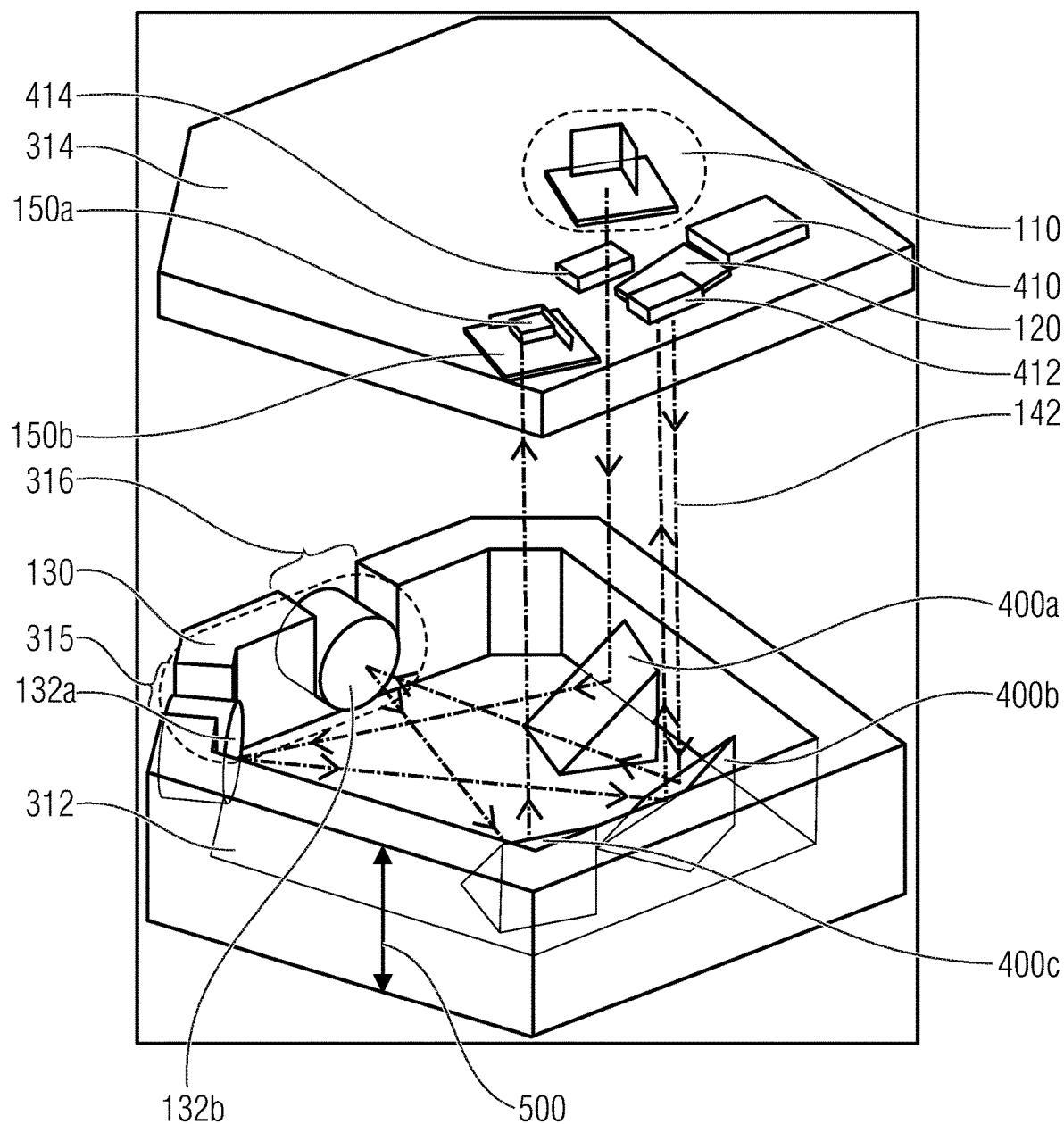
FIG. 12 is a schematic illustration of the spectrometer including three deflection mirrors according to an embodiment of the present invention.

FIG. 12 shows a schematic illustration of the spectrometer 100 including three deflection mirrors 400a-400c according to an embodiment of the present invention. FIG. 12 shows, for example, a crossed Czerny-Turner spectrometer 100 in quasi planar structure. The spectrometer 100 includes a carrier member including two parts, a bottom 312 and a lid 314. The bottom 312 is, for example, formed as a tray with indentations 315, 316 at the sides for pick and place assembly of reflective imaging optics 130 with a first optical functional element 132a and a second optical functional element 132b from the top. The first optical functional element 132a and/or the second optical functional element 132b can be a mirror. The indentations 315, 316 form at least two lateral openings in the carrier member on which the at least two members, e.g., the first optical functional element 132a and the second optical functional element 132b, are mounted.

In one embodiment, the spectral analysis system 100 includes a lid. In the lid, at least one of the inlet opening, the outlet opening and/or the detector area, the at least one optical functional element and the dispersive optical element is integrated. The lid 314 of the spectrometer 100 of FIG. 12 includes, e.g., an inlet opening 110, an outlet opening 150b, a detector area 150a and a dispersive element 120. Thereby, the spectrometer can be realized in a very small manner since less elements of the spectrometer 100 increase or influence the expansion perpendicular to the thickness direction 500.

In one embodiment, the deflection mirrors 400a-400c are configured to direct an optical path 142, e.g. in the direction of inlet and outlet gap. In that way, the optical path 142 can impinge, e.g. from an inlet gap 110 onto the deflection mirror 400a, can be redirected from there in the direction of the first optical functional element 132a and from there across the deflection mirror 400b to a dispersive optical element 120 from which the optical path impinges on a detector area 150a across the deflection mirror 400b, the second optical functional element 132b and the deflection mirror 400c through an outlet gap 150b. The detector area 150a can be formed, for example, as photodetector. The deflection mirrors 400a-400c can either be integrated as discrete members for pick and place assembly into the bottom 312 from the top or can be monolithically integrated in the bottom 312 and subsequently mirrored.

In one embodiment, the optical path 142 runs mostly transversely to the thickness direction 500 and only part of the optical path runs parallel to the thickness direction 500. In that way, the optical path 142 in FIG. 12 travels, e.g. four short distances between elements disposed on the lid 314 and the deflection mirrors 400a-400c on the bottom 312, parallel to the thickness direction 500 and four long distances between the deflection mirrors 400a-400c and the first optical reflective element 132a or the second optical reflective element 132b at an angle between 80° and 100° relative to the thickness direction 500. Thus, more than 50% of the distance runs transversely to the thickness direction. However, it is also possible that more than 60%, 70% or even 75% of the distance runs mostly transversely to the thickness direction 500.

In one embodiment, the bottom 312 or the lid 314 can include integrated structures for suppressing stray light. The bottom 312 and/or the lid 314 can be made, for example, of plastic or ceramics (possibly also metal and composite materials). Metal material is particularly advantageous, since metal material screens the optical path volume from outside light. According to an embodiment, dyes can be added in plastic materials, or surface modifications, such as surface coating or surface roughening can be performed in order to screen outside radiation and/or to realize a stray radiation absorbing carrier member 160. Surface modifications can also be performed in a carrier member comprising metal material for reducing stray radiation within the spectrometer. In one embodiment, the lid 314 and/or the bottom 312 can be realized directly as (stiffened) printed circuit board or can be configured as wiring carrier. Basically, all common board technologies are possible for the bottom 312 and/or the lid 314, including 3D-MID technologies and ceramics technologies (when folding the optical beam for the outlet gap 150b down to the bottom, the bottom 312 can also be produced in 3D MID or ceramics technology.

In one embodiment, the optical functional elements (e.g., first optical functional element 132a and second optical functional element 132b) can have different area shapes, e.g., spherical, aspherical, cylindrical, torical, biconical, generally asymmetrical (off-axis area portions of different symmetrical or asymmetrical areas) and/or as a mirror.

In one embodiment, gaps, e.g., the inlet gap 110 and the outlet gap 150b can be configured as separate members or can be integrated in the lid. The gaps can be produced of all accordingly machinable materials, such as plastic, ceramic, metal, composite materials, silicon or similar materials known from semiconductor technology in a molding or ablative manner. That way, the gap can be produced, for example by laser structuring. Additionally, the gaps can be mounted, for example by pick and place possibly highly accurately in a planar manner on the bottom side of the lid 314 directed towards the direction of the bottom 312.

In one embodiment, the detector/detector area 150*a* (photodiode or photo conductor etc.) can be mounted directly on the bottom side of the lid 314 and can be contacted there if the lid 314 is configured as a wiring carrier.

In one embodiment, electronic members 410, 412, 414 for spectrometer electronics can be configured directly on the lid 314, either pointing to the outside or pointing to the inside or pointing both to the outside and to the inside. An advantageous space gain can be obtained with electronic members 410, 412, 414 directed to the inside. The electronic members 410, 412, 414 can be service mounted devices (smd) regulating, for example, a deflection of the dispersive optical element 110 or controlling the detector area 150*a*.

In one embodiment, an MEMS, e.g., the dispersive optical element 120, has similar features as the detector 150*a*, e.g., assembly on the bottom side of the lid if a third deflection mirror 400*b* exists in the optical path 142. Advantages of this variation are, among others, that production of the essential optical members (e.g., the optical functional elements 132*a* and 132*b*) is possible by means of injection molding (suitable for mass production), that a greatly simplified assembly with standard planar pick and place technology can be used in that only a final assembly step is needed when joining lid 314 and bottom 312, and that the inlet gap 110 and the board (e.g., the lid 314) are favorably situated for usage in mobile terminal devices.

In one embodiment, the outlet gap 150*b* can be omitted due to an adapted design of the active detector area 150*a*, the same acts, for example, simultaneously as exit gap 150*b* with mostly rectangular shape, which represents, e.g., a simplification of the spectrometer 100 illustrated in FIG. 12. A further simplification of the spectrometer could be realized by integrating the inlet gap 110 in the lid 314 (or bottom 312) which realizes minimization of the number of devices.

Even when the bottom 312 and the lid 314 are illustrated in a spatially separate manner in the schematic illustration of the spectrometer 100 in FIG. 12, the bottom 312 and the lid 314 are connected to one another. Further, the bottom 312 as well as the lid 314 can also have, instead of a hexagonal base as shown in FIG. 12, more or less corners or lateral surfaces or can have round lateral surfaces or even wave-shaped lateral surfaces.

In the following FIGS. 13 to 16, enlargements among others of the bottom 312 and the lid 314 of the spectrometer 100 of FIG. 12 are shown from different perspectives. All elements having the same reference numbers as the elements in FIG. 12 can have the same features and functionalities as the corresponding elements in FIG. 12.

Figure 13:
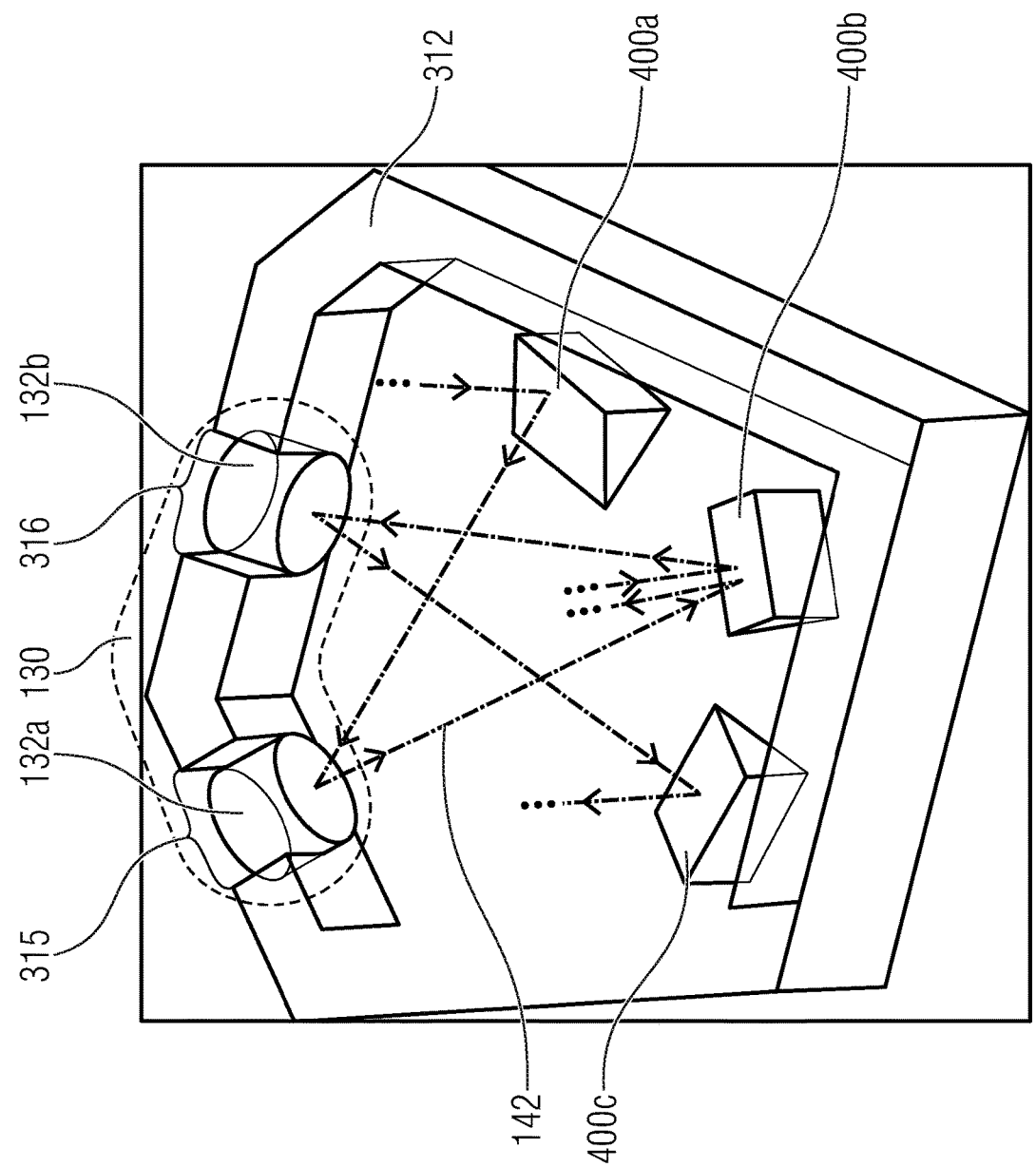
FIG. 13 is a schematic illustration of a bottom of the spectrometer of FIG. 12 according to an embodiment of the present invention.

FIG. 13 shows a schematic illustration of the bottom 312 of the spectrometer 100 of FIG. 12 with the same elements as in FIG. 12 according to an embodiment of the present invention.

Figure 14:
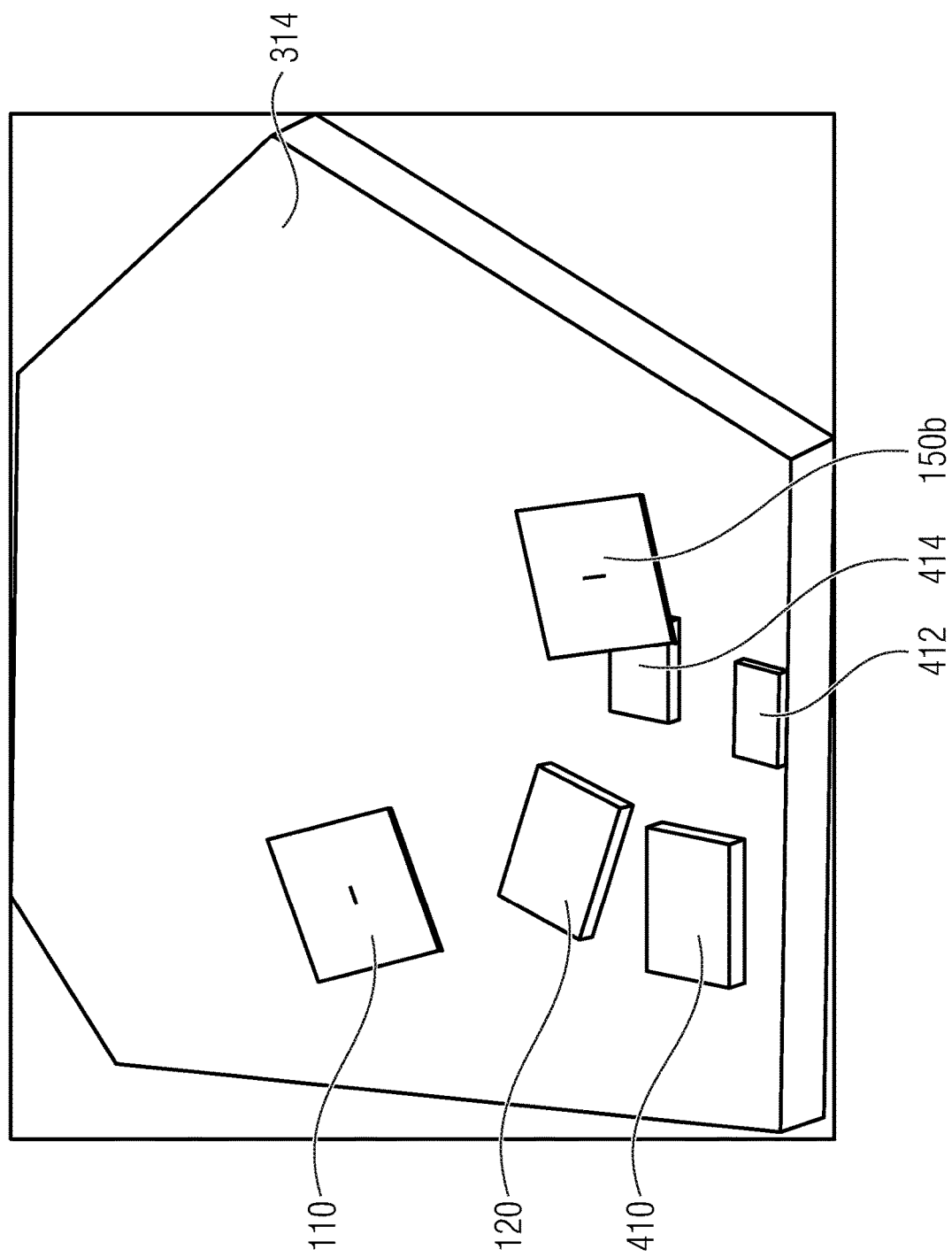
FIG. 14 is a schematic illustration of a lid of the spectrometer of FIG. 12 according to an embodiment of the present invention.

FIG. 14 shows a schematic illustration of an area of the lid 314 of the spectrometer 100 of FIG. 12 pointing in the direction of the bottom 312 with the same elements as in FIG. 12 according to the embodiment of the present invention.

Figure 15:
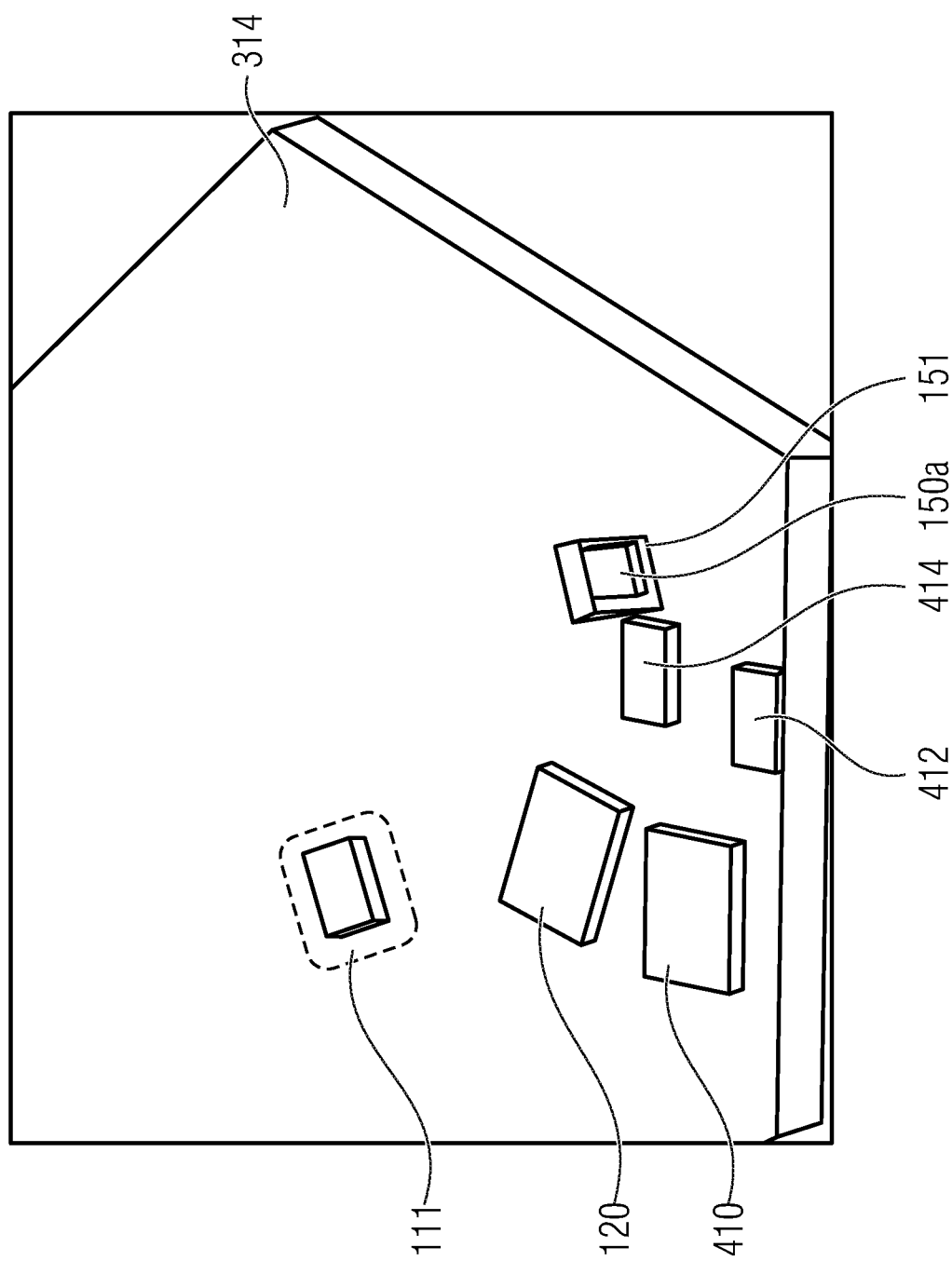
FIG. 15 is a schematic illustration of a lid of the spectrometer of FIG. 12 without the inlet gap and without the outlet gap according to an embodiment of the present invention.

FIG. 15 shows a schematic illustration of an area of the lid 314 of the spectrometer 100 of FIG. 12 pointing in the direction of the bottom 312 without the inlet gap 110 and without the outlet gap 150*b* according to an embodiment of the present invention. A first cavity 111 and a second recess 151 are integrated in the lid 314. The first cavity 111 is limited by the inlet gap 110 and the second cavity with the outlet gap 150*b* in the direction of the bottom of the spectrometer 100 of FIG. 12. The detector area 150*a* is integrated in the second cavity 151.

Figure 16:
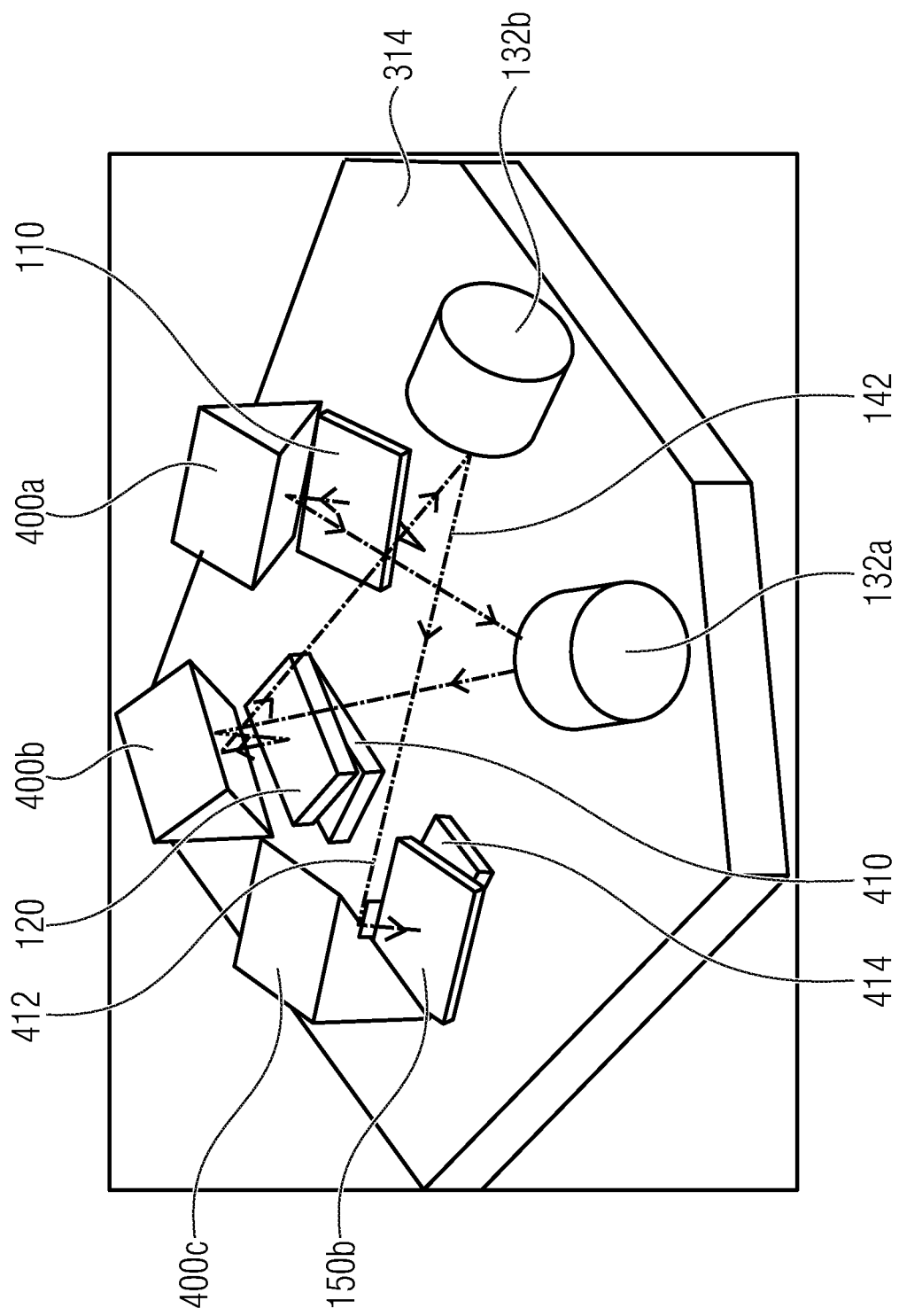
FIG. 16 is a schematic illustration of a lid of the spectrometer of FIG. 12 with deflection mirrors according to an embodiment of the present invention.

FIG. 16 shows a schematic illustration of an area of the lid 314 of the spectrometer 100 of FIG. 12 pointing in the direction of the bottom 312 with the deflection mirrors 400*a*-400*c* according to an embodiment of the present invention. The deflection mirrors 400*a*-400*c* as well as the first optical functional element 132*a* and the second optical functional element 132*b* are arranged on a bottom 312 of the spectrometer 100 as shown in FIG. 12, which is not shown in FIG. 16.

Even when a crossed optical path 142 is illustrated in the FIGS. 12 to 16, the spectrometer 100 can also be realized with a non-crossed optical path.

Figure 17:
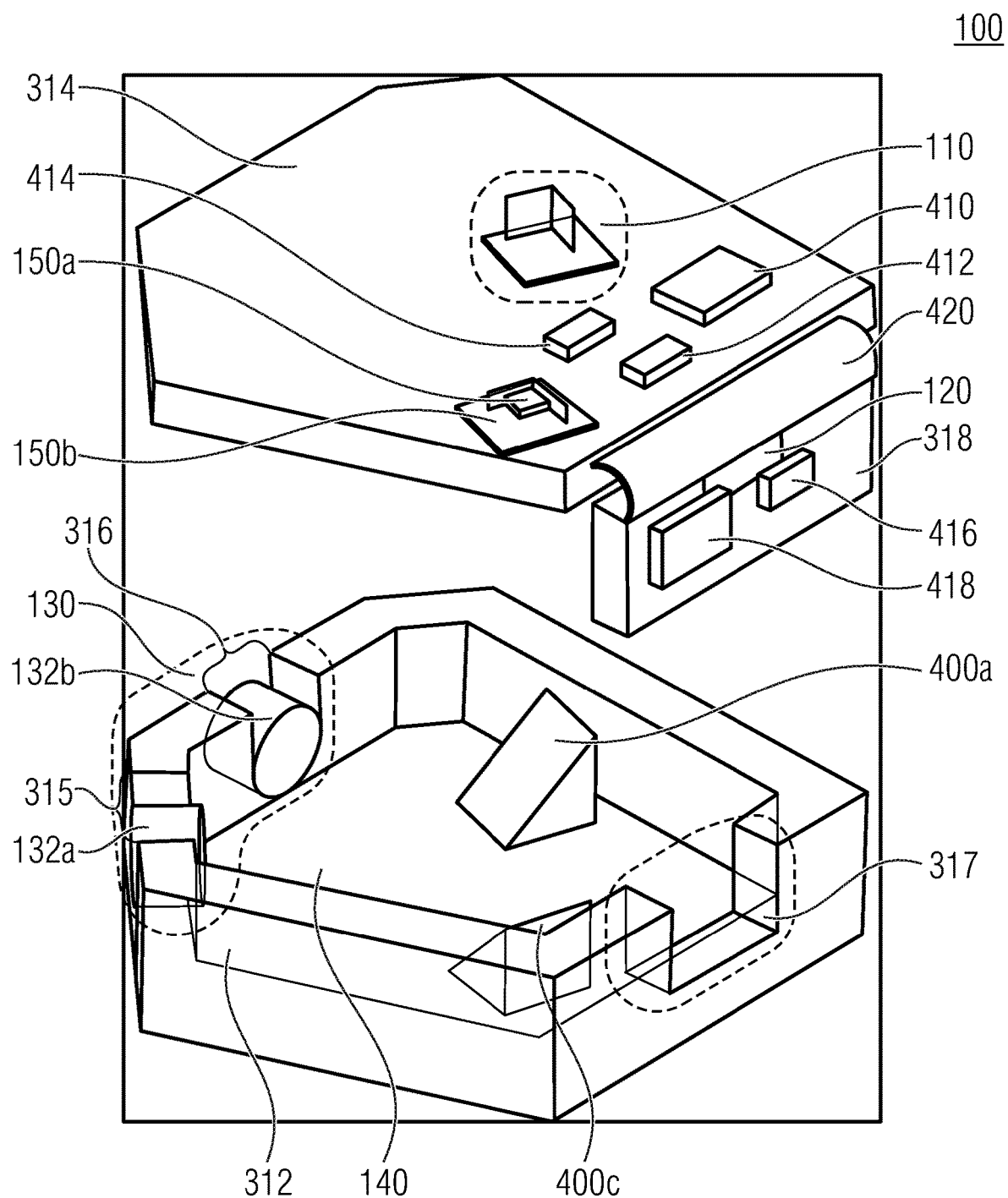
FIG. 17 is a schematic illustration of the spectrometer including two deflection mirrors according to an embodiment of the present invention.

FIG. 17 shows a schematic illustration of the spectrometer 100 including two deflection mirrors 400*a* and 400*c* according to an embodiment of the present invention.

In one embodiment, the spectrometer 100 includes at least one deflection mirror 140*a*, 140*c*.

FIG. 17 shows a slightly amended variation of the spectrometer 100 of FIG. 12. An additional board/substrate 318 is arranged, for example, at a lateral surface for receiving the dispersive optical element 120 (MEMS). This means that, for example, the dispersive optical element 120 is arranged on a surface of the substrate 318 pointing to the optical path volume 140. Therefore, e.g., no third folding mirror, e.g. the deflection mirror 400*b* of FIG. 12, is needed, which results in less tolerance issues. But one side wall of the bottom 312 includes, for example, a third indentation 317.

In one embodiment, the substrate 318 includes electronic members 416, 418 which can have the same features and functionalities as the electronic members 410, 412 and 414 of FIG. 12.

In one embodiment, the lid 314 of the spectrometer 100 comprises a flex connection 420 to the lateral board (substrate 318) with MEMS. Thus, during final assembly, the substrate 318 can be folded down and the dispersive optical element 120 is inserted into the third indentation 317. For example, a flex board can be used for the lid 314 with the substrate 318.

In one embodiment, the spectrometer 100 of FIGS. 1, 2, 10, 11, 12 and 17 can include a temperature sensor for measuring the temperature at or in the spectrometer 100, which is a supplement.

In the following FIGS. 18 to 20, enlargements, among others of the bottom 312 and the lid 314 of the spectrometer 100 of FIG. 17, are illustrated from different perspectives. All elements having the same reference numbers as elements in FIG. 17 can have the same features and functionalities as the corresponding elements in FIG. 17.

Figure 18:
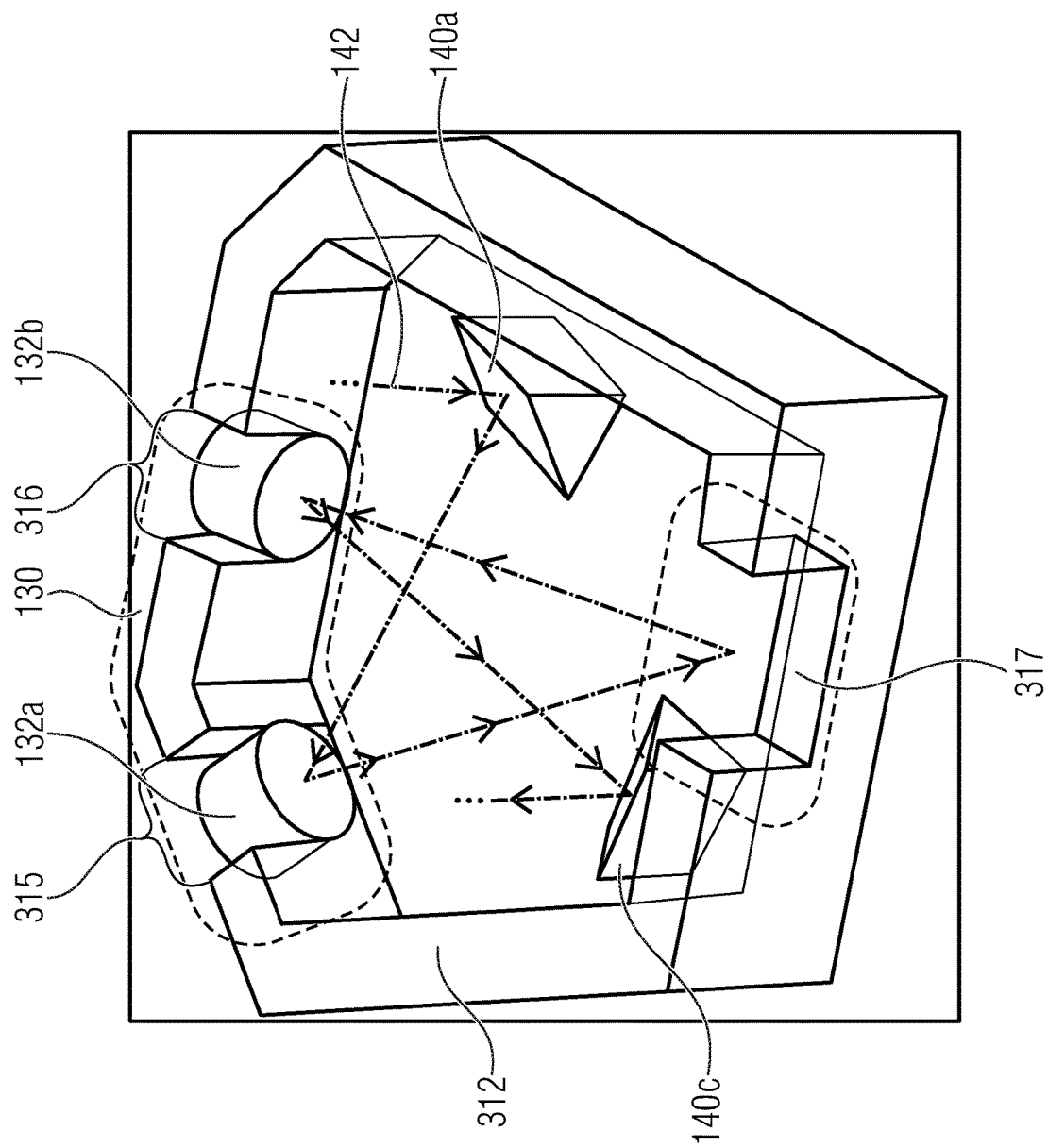
FIG. 18 is a schematic illustration of a bottom of the spectrometer of FIG. 17 according to an embodiment of the present invention.

FIG. 18 shows a schematic illustration of the bottom 312 of the spectrometer 100 of FIG. 17 having the same elements as in FIG. 17 according to an embodiment of the present invention. Additionally, a possible crossed optical path 142 is shown.

Figure 19:
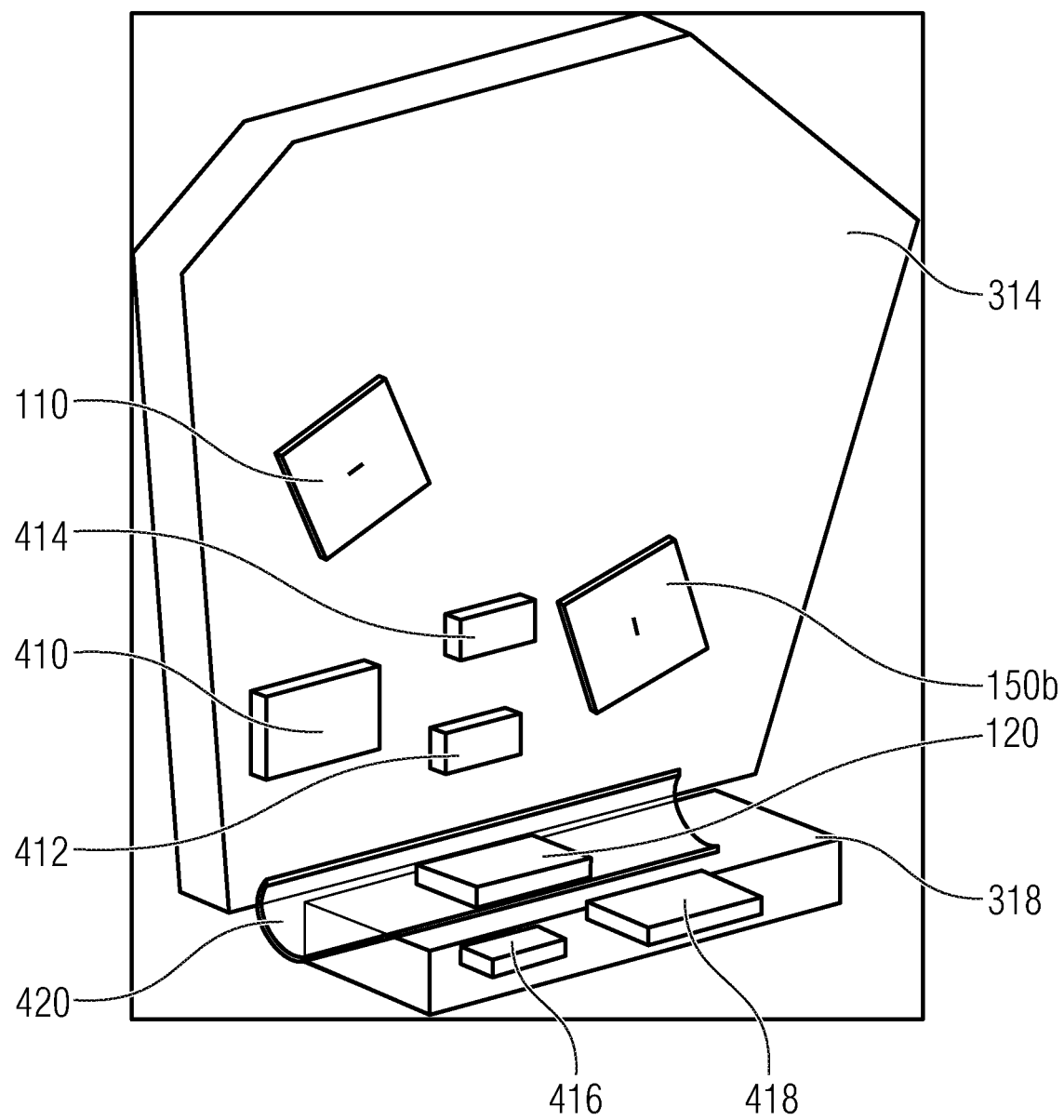
FIG. 19 is a schematic illustration of a lid of the spectrometer of FIG. 17 with a substrate according to an embodiment of the present invention.

FIG. 19 shows a schematic illustration of an area of the lid 314 of the spectrometer 100 of FIG. 17 pointing in the direction of the bottom 312 with a substrate 318 according to an embodiment of the present invention.

Figure 20:
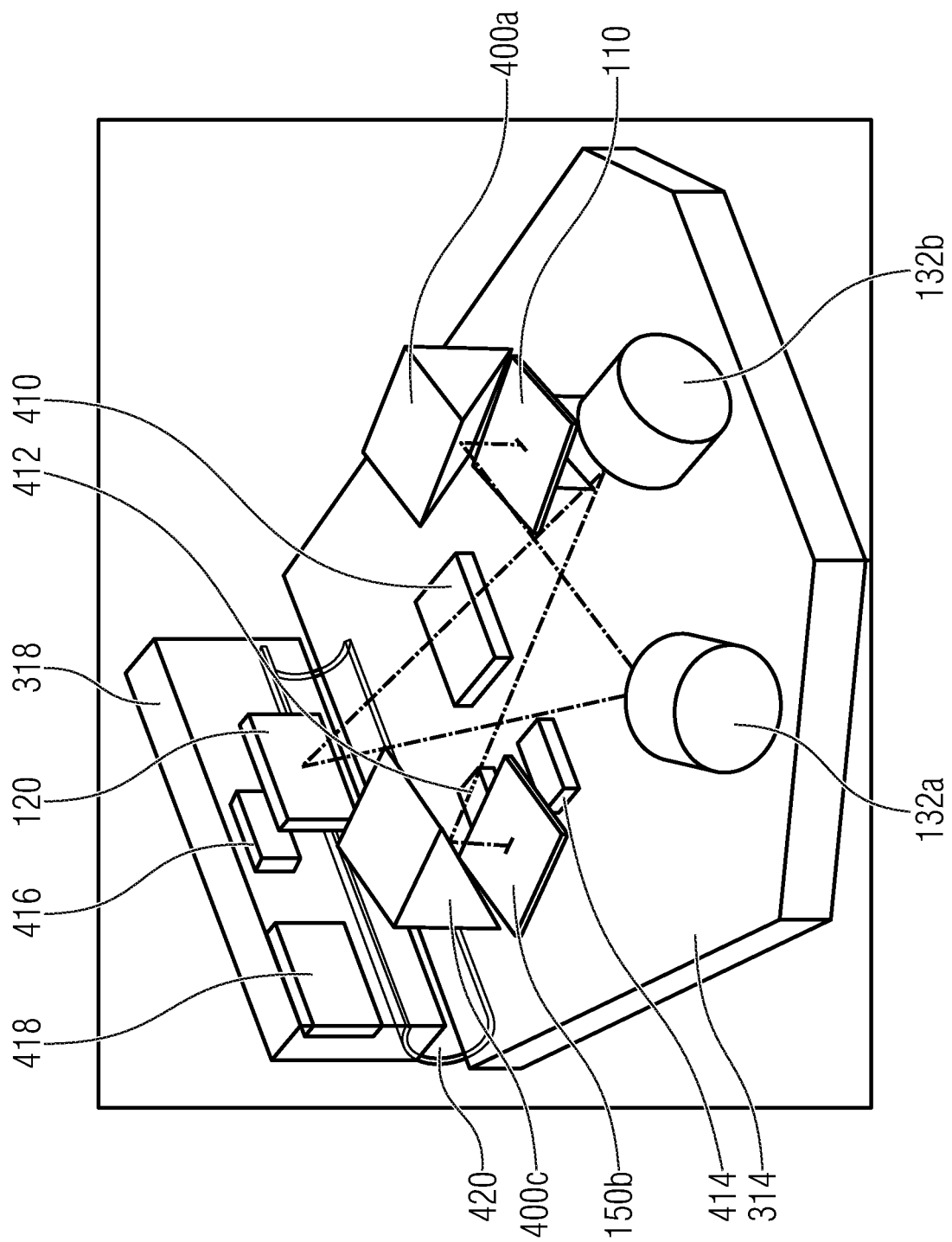
FIG. 20 is a schematic illustration of a lid of the spectrometer of FIG. 17 with a substrate and two deflection mirrors according to an embodiment of the present invention.

FIG. 20 shows a schematic illustration of an area of the lid 314 of the spectrometer 100 of FIG. 17 pointing in the direction of the bottom 312 with a substrate 318 and two deflection mirrors 400*a* and 400*c* according to an embodiment of the present invention. Additionally, a possible crossed optical path 142 is shown. The two deflection mirrors 400a and 400c as well as the first optical functional element 132a and the second optical functional element 132b are disposed on the bottom 312 of the spectrometer 100 as shown in FIG. 17, which is not shown in FIG. 20.

Figure 21:
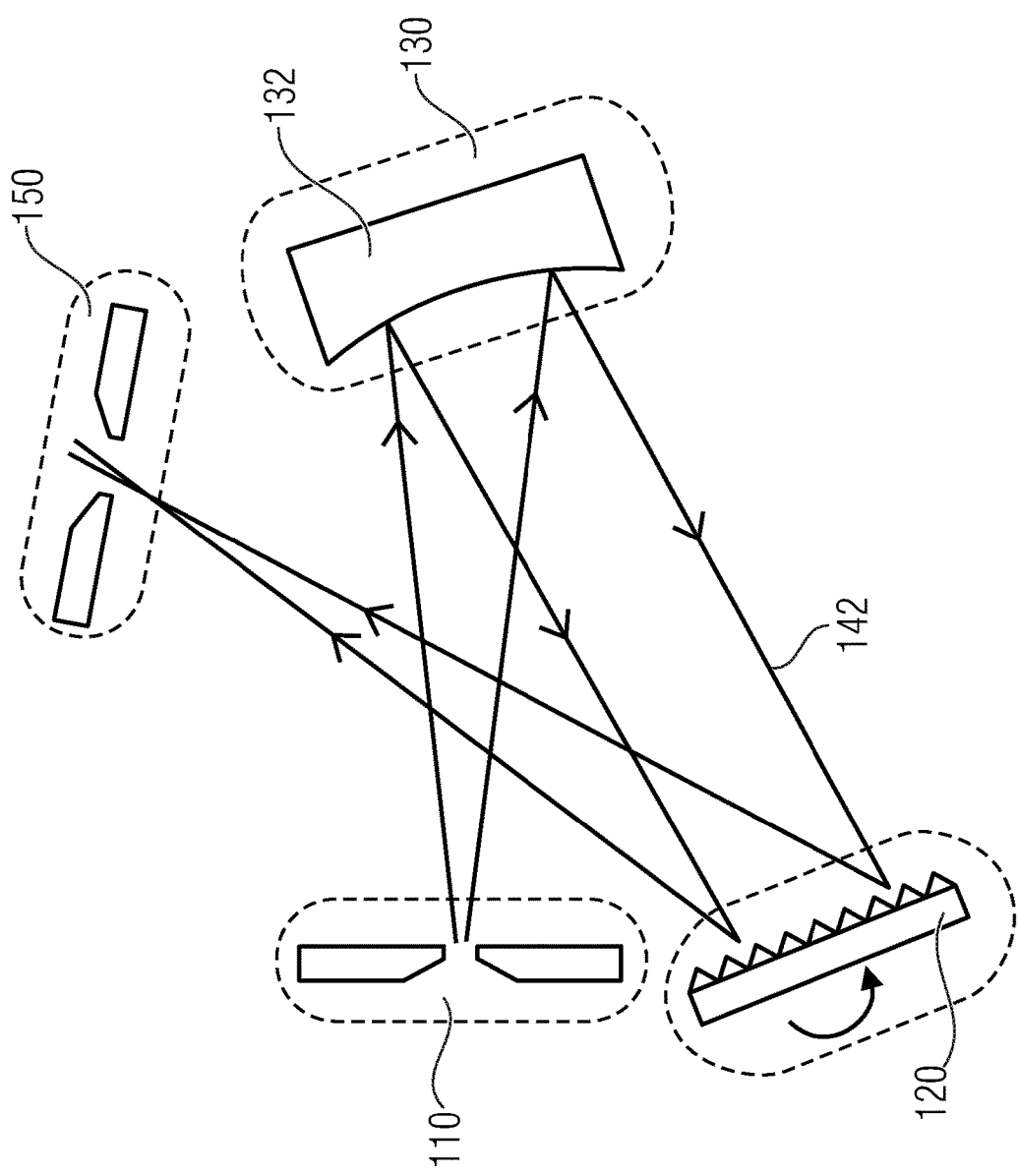
FIG. 21 is a schematic illustration of the spectrometer having only one optical functional element according to an embodiment of the present invention.

FIG. 21 shows a schematic illustration of the spectrometer 100 having only one optical functional element 132 according to an embodiment of the present invention. This is, for example, a crossed Monk-Gillieson spectrometer. The difference to a Czerny-Turner spectrometer is, e.g. that the spectrometer 100 includes only an imaging mirror (optical functional element 132) and a grating (dispersive optical element 120) in the convergent or divergent optical path 142, wherein no collimation of the electromagnetic radiation is performed as in a Czerny-Turner spectrometer. Apart from that, the spectrometer 100 comprises almost all features of the Czerny-Turner spectrometer (see FIGS. 1, 2, 10, 11, 12 and 17). Thus, the spectrometer 100 comprises, e.g., an inlet gap 110, an outlet gap and/or a detector area 150, reflecting optics 130 having an optical functional element 132 and a dispersive optical element 120 which is rotatable. In FIG. 21, the carrier member connecting the individual elements of the spectrometer 100 is not shown. The optical functional element 132 is, for example, a concave mirror.

One particularity in this variation of the spectrometer 100 is the diffraction grating 120. Advantageously, the grating is configured in an aberration-corrected manner, i.e., a specific variation of the line distance and/or a deviation from a straight line is caused for increasing the spectral resolution.

In one embodiment, the dispersive optical element 120 is in a convergent or divergent part of the optical path 142. In this case, the dispersive optical element 120 can have, e.g., several functions, on the one hand, e.g. spectrally splitting the incoming electromagnetic radiation and, on the other hand, directing and focusing the spectrally split radiation in the direction of the outlet gap and/or the detector area 150. Thereby, fewer members are needed for the spectrometer 100 which results a more cost-effective production.

Figure 22:
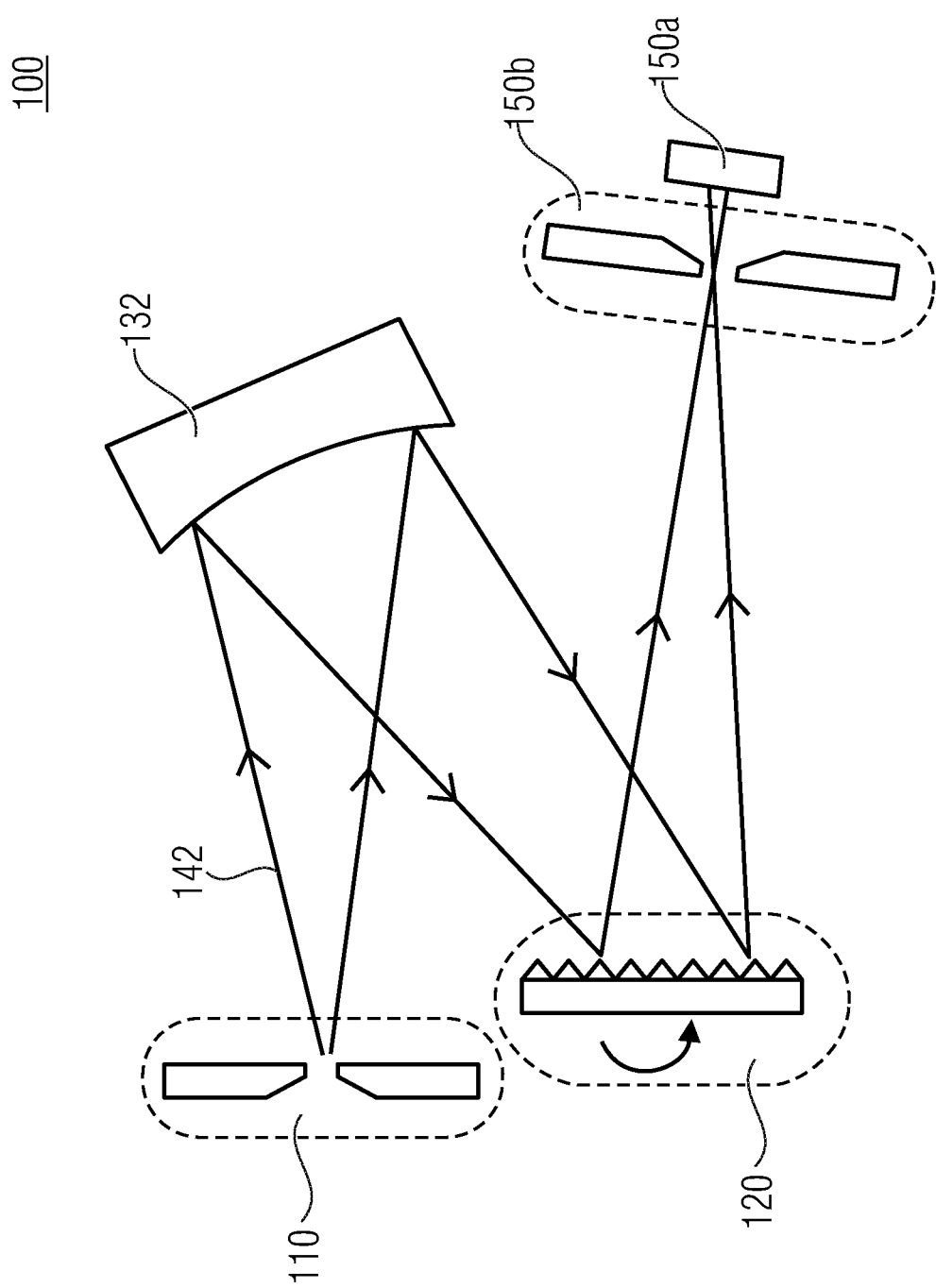
FIG. 22 is a schematic illustration of the spectrometer of FIG. 21 having only one optical functional element and no crossed optical path according to an embodiment of the present invention.

FIG. 22 shows a schematic illustration of the spectrometer 100 of FIG. 21 having only one optical functional element 132 and no crossed optical path 142 according to an embodiment of the present invention. Since the optical path 142 is not crossed, the spectrometer can be produced in large quantities and at little cost by the specific design with the carrier member not shown in FIG. 22. Additionally, the spectrometer 100 can be realized to be small, but not as greatly miniaturized as in a crossed optical path. A further difference to the spectrometer 100 of FIG. 21 is that the spectrometer 100 of FIG. 22 comprises both an outlet gap 150b as well as a detector area 150a.

In other words, the invention is based on the finding that miniaturized spectroscopic apparatuses with quite good performance can be produced with the MEMS devices described in conventional technology, but that the same have, in the known embodiments, a serious drawback standing in the way of economical production. The embodiments described in conventional technology are stacked structures, i.e. the spectroscopic apparatus is composed of a stack of different substrates or sub-assemblies. This basic structure allows basically the cost-effective production of a greatly miniaturized spectrometer in large quantities with the method of modern microassembly. However, a basic prerequisite is a cost-effective availability of all members in the substrate stack. However, this is currently not the case. Due to the geometry of the included optical path, the stacked approach needs a complexly shaped member having several mirror areas. For ensuring the device function, this member is subject to tight tolerances. Due to this fact, the production is technically expensive and cannot be produced with production processes such as injection molding or glass molding that are suitable for mass-production.

The inventive solution avoids such complicated members and hence allows economical production with the same performance. For this, the approaches and geometries of the optical path used so far are deviated from and instead a design referred to as crossed Czerny-Turner assembly is used. The same is basically known but it is novel in miniaturized form in combination with movable MEMS diffraction gratings. Thereby, the complex two mirror member is "disintegrated" into two, e.g. simple rotationally symmetrical mirrors. The same can be produced, e.g., with currently available technologies without any problems with high accuracy and in different quantities, from small batches up to enormous quantities. This is possible due to the significantly simplified design (rotational symmetry) of the optical functional elements. By crossing the respective parts of the optical path, additionally, larger separation of the two mirror areas as an example for an optical functional element results, such that, e.g., the room needed for process-safe assembly results. A further advantage of the crossed optical path compared to conventional technology for stacked MEMS spectrometers is a significantly greater distance of inlet and outlet gaps, since the same are now, e.g., on different sides of the spectroscopic apparatus. Thereby, the integration of a frequently optionally needed coupling-in optics in front of the inlet gap is greatly simplified.

The needed MEMS grating mirrors can be taken, for example, from conventional technology. However, the invention includes a number of embodiments for which also new adapted MEMS members are used. For example, the outlet gap can be integrated in an MEMS substrate and hence the assembly effort can be reduced and some tolerances can be selected to be very tight, which is again favorable for system performance.

A further important feature of the invention is the option of mounting all functional elements (e.g. inlet gap, outlet gap, reflective imaging optics, dispersive optical element) directly on a carrier member. Normally, for the assembly of compact spectrometers, significantly more mechanical parts for holding the optical function elements are needed due to the structural size. Compared to the stacked MEMS spectrometers, e.g. when using only one member for holding (e.g. the carrier member), no chains of tolerance for the position of the optical functional element built up. Due to, for example the small structural size of the inventive solution, very different methods can be used for producing the carrier member which again reach from the small batch to bulk production. As examples, machining, additive productions methods and injection molding are stated.

Advantages in systems engineering for automated microassembly ("pick and place" technology) nowadays allow very efficient assembly of the inventive solution even when the purely stacked process is departed from in favor of a multi-facet approach. A further advantage of this approach is, e.g., an enormous mechanical and thermal stability gain of the overall system.

Additionally, in the spectrometer described herein, for example, bending substrates can be used and the folding assembly can be used as method.

The spectrometer described herein can be described, in other words, by the following embodiments.

In one embodiment, the spectroscopic apparatus/spectrometer for performing spectral analytical measurement comprises the following elements:

an inlet opening through which the electromagnetic radiation can enter an optical path of the spectroscopic apparatus;

a first optical functional element for collimation of the radiation;

a dispersive optical element for spectral splitting of electromagnetic radiation;

a second optical functional element for focusing the radiation;

an outlet opening through which the spectrally split electromagnetic radiation can leave the optical path;

wherein the elements are arranged such that an optical path is formed where the radiation passing through the inlet opening impinges on the first optical functional element in the form of a beam of rays, then onto the dispersive optical element, then onto the second optical functional element and can then leave the optical path through the outlet opening and wherein the part of the beam of rays passing between the inlet opening and the first optical element and the part of the beam of rays passing between the second optical element and the outlet opening cross each other.

In one embodiment, the first optical functional element includes a mirror or a lens.

In one embodiment, the second optical functional element includes a mirror or a lens.

In one embodiment, the optically effective areas of the optical functional elements include spherical or aspherical or cylindrical or biconical areas.

In one embodiment, an angle between a main ray or central ray of the first beam of rays and a main ray or a central ray of the second beam of rays is between 10° and 100°.

In one embodiment, the dispersive optical element is configured in a rotatable manner.

In one embodiment, the dispersive optical element includes a diffraction grating or the dispersive optical element is a diffraction grating.

In one embodiment, the diffraction grating is configured as rotatable micromechanical device.

In one embodiment, the micromechanical device is produced in silicon microtechnology.

In one embodiment, the micromechanical device comprises an electrostatic or piezoelectric or electromagnetic drive for deflecting the diffraction grating.

In one embodiment, the micromechanical device comprises an optical or electric sensor for determining a deflection position of the device.

In one embodiment, the inlet opening and/or the outlet opening is produced in a silicon microtechnology or by means of laser material processing.

In one embodiment, the rotatable diffraction grating and the outlet opening are produced in a common substrate.

In one embodiment, the inlet opening, the outlet opening, the two optical functional elements and the dispersive optical element are mounted on a common mechanical carrier substrate or carrier member.

In one embodiment, a detector/detector area for detecting electromagnetic radiation is arranged in beam direction behind the outlet opening.

In one embodiment, the micromechanical device and the detector for detecting electromagnetic radiation are arranged on a common wiring carrier.

In one embodiment, the micromechanical device and the outlet opening are produced in a common substrate and the same is arranged on a common wiring carrier with a detector/detector area for detecting electromagnetic radiation.

In one embodiment, the focal length range of the at least one optical functional element of the optically reflective imaging optics is in a range having a bottom limit of 100 mm, 150 mm, 200 mm, 250 mm, 300 mm or 350 mm and an upper limit of 550 mm, 600 mm, 700 mm, 800 mm or 1000 mm.

In one embodiment, a monolithic bending substrate is used for the carrier member.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Spectral analysis system for capturing a spectrum, comprising
an inlet opening, a dispersive optical element and at least partly reflective imaging or beam forming optics comprising at least one optical functional element defining an optical path from the inlet opening across the dispersive optical element onto an outlet opening and/or detector area of the spectral analysis system, wherein the dispersive optical element is configured in a stationary manner; and
a carrier member defining a flat optical path volume comprising at least one lateral opening,
wherein at least one of
the inlet opening,
the outlet opening and/or detector area,
the at least one optical functional element and
the dispersive optical element
is integrated in at least one member,
wherein the at least one member is mounted on the carrier member at the at least one lateral opening, such that the optical path mainly runs transversely to a thickness direction of the optical path volume; and
wherein the spectral analysis system comprises a movable mirror; and/or
wherein the spectral analysis system comprises an electrostatic, piezoelectric, electromagnetic or magnetostrictive drive for deflecting the movable mirror; and/or
wherein the spectral analysis system comprises an optical or electric sensor for determining a deflecting position of the movable mirror.

2. Spectral analysis system according to claim 1, wherein the carrier member defines a flat optical path volume comprising at least two lateral openings and/or wherein the at least two lateral openings are at an angle to each other.

3. Spectral analysis system according to claim 1, wherein the at least one member is disposed on a side of the carrier member facing away from the optical path volume.

4. Spectral analysis system according to claim 1, wherein the carrier member comprises a bottom and lateral walls and wherein the at least one lateral opening is disposed in at least one of the lateral walls.

5. Spectral analysis system according to claim 1, wherein the optical path is a crossed optical path comprising crossing optical path portions projected along the thickness direction of the optical path volume.

6. Spectral analysis system according to claim 1, wherein the inlet opening is configured to allow electromagnetic radiation to enter an optical path of the spectral analysis system and to direct the same onto a first optical functional element of the reflective imaging or beamforming optics;
  wherein the first optical functional element is configured to collimate the electromagnetic radiation and to direct the same onto the dispersive optical element;
  wherein the dispersive optical element is configured to spectrally split the electromagnetic radiation and to direct the same onto a second optical functional element of the reflective imaging or beamforming optics, wherein the electromagnetic radiation directed by the dispersive optical element onto the second optical functional element crosses the electromagnetic radiation directed from the inlet opening onto the first optical functional element;
  wherein the second optical functional element is configured to focus the electromagnetic radiation within an optical depth of field and to direct the same onto the outlet opening and/or detector area, wherein the spectrally split electromagnetic radiation directed by the second optical functional element onto the outlet opening and/or detector area crosses both the electromagnetic radiation directed from the inlet opening onto the first optical functional element as well as the electromagnetic radiation directed by the first optical functional element onto the dispersive optical element.

7. Spectral analysis system according to claim 1, wherein the dispersive optical element is within a convergent or divergent part of the optical path.

8. Spectral analysis system according to claim 1, wherein an angle between a first central ray of a beam of rays directed onto an optical functional element of the reflective imaging or beamforming optics or the dispersive optical element and a second central ray of a beam of rays reflected by the optical functional element or dispersive optical element is between 10° and 120° and/or wherein an angle between a first central ray of a beam of rays passing through the inlet opening and a second central ray of a beam of rays impinging on the outlet opening is between 10° and 120°.

9. Spectral analysis system according to claim 1, wherein the spectral analysis system comprises a lid, wherein at least one of
  the inlet opening,
  the outlet opening and/or the detector area,
  the at least one optical functional element and
  the dispersive optical element
is integrated in the lid.

10. Spectral analysis system according to claim 1, wherein the optical path mostly runs transversely to the thickness direction and only part of the optical path runs parallel to the thickness direction.

11. Spectral analysis system according to claim 1, wherein the inlet opening, the outlet opening and/or detector area, the at least one optical functional element and the dispersive optical element are disposed directly or indirectly on the carrier member.

12. Spectral analysis system according to claim 1, wherein the at least one optical functional element comprises a mirror, a lens or a combination of the same; and/or
  wherein the optically effective area of the at least one optical functional element is a spherical, aspherical, cylindrical, torical and/or biconical area and/or free-form area.

13. Spectral analysis system according to claim 1, wherein the dispersive optical element comprises a diffraction grating and/or the grating is aberration-corrected.

14. Spectral analysis system according to claim 1, wherein the detector area comprises an active area, wherein the active area acts as outlet gap and/or wherein the outlet opening or the detector area and the dispersive optical element are arranged on a common wiring carrier.

15. Spectral analysis system according to claim 1, wherein the inlet opening and the outlet opening are integrated in a common member or are arranged on the same.

16. Spectral analysis system according to claim 1, wherein the detector area detects the electromagnetic radiation leaving the optical path through the outlet opening in a spectrally split manner.

17. Spectral analysis system according to claim 16, wherein the outlet opening is arranged on a common wiring carrier with the detector area and the dispersive optical element.

18. Spectral analysis system according to claim 1, wherein the inlet opening, the outlet opening and/or the dispersive optical element are produced in silicon microtechnology and/or wherein the inlet opening and/or the outlet opening are produced by means of laser material machining or a replicating technology.

19. Spectral analysis system according to claim 1, wherein the spectral analysis system is of the type of a Czerny-Turner or a Monk-Gillieson spectrometer.

20. Method for capturing a spectrum by means of a spectral analysis system according to claim 1.

21. Spectral analysis system for capturing a spectrum, comprising
  an inlet opening, a dispersive optical element and at least partly reflective imaging or beam forming optics comprising at least one optical functional element defining an optical path from the inlet opening across the dispersive optical element onto an outlet opening and/or detector area of the spectral analysis system, wherein the dispersive optical element is configured in a stationary manner; and
  a carrier member defining a flat optical path volume comprising at least one lateral opening,
  wherein at least one of
    the inlet opening,
    the outlet opening and/or detector area,
    the at least one optical functional element and
    the dispersive optical element
  is integrated in at least one member,
  wherein the at least one member is mounted on the carrier member at the at least one lateral opening, such that the optical path mainly runs transversely to a thickness direction of the optical path volume; and
  wherein the spectral analysis system comprises a lid, wherein at least one of
    the inlet opening,
    the outlet opening and/or the detector area,
    the at least one optical functional element and
    the dispersive optical element
  is integrated in the lid.

* * * * *